United States Patent [19]

Tiefenbacher et al.

[11] Patent Number: 5,376,320
[45] Date of Patent: Dec. 27, 1994

[54] PROCESS OF PRODUCING ROTTABLE THIN-WALLED SHAPED BODIES MADE OF STARCH

[75] Inventors: Karl Tiefenbacher, Vienna; Franz Haas, Leobendorf; Johann Haas, Klosterneuburg, all of Austria

[73] Assignee: Biopac Biologische Verpackungssysteme Gesellschaft m.b.H., Leobendorf, Austria

[21] Appl. No.: 916,865

[22] PCT Filed: Feb. 5, 1991

[86] PCT No.: PCT/AT91/00019

§ 371 Date: Jul. 30, 1992

§ 102(e) Date: Jul. 30, 1992

[87] PCT Pub. No.: WO91/02186

PCT Pub. Date: Aug. 22, 1991

[30] Foreign Application Priority Data

Feb. 6, 1990 [AT] Austria ................................. 252/90
Jun. 7, 1990 [AT] Austria ................................. 1241/90
Aug. 31, 1990 [AT] Austria ................................. 1783/90

[51] Int. Cl.$^5$ ............................................. B29C 67/24
[52] U.S. Cl. ............................... 264/50; 264/232; 264/259; 264/300
[58] Field of Search ............. 264/50, 53, 328.1, 300, 264/186, 330, 259, 232; 106/210, 213; 426/138

[56] References Cited

U.S. PATENT DOCUMENTS

| | | |
|---|---|---|
| 2,968,561 | 1/1961 | Birnkraut . |
| 3,268,338 | 8/1966 | Strobel . |
| 4,644,733 | 2/1987 | Dolinar ........................ 264/45.6 |
| 4,673,438 | 6/1987 | Wittwer et al. ................. 264/328.1 |
| 4,830,866 | 5/1989 | Manser et al. .................. 426/557 |
| 4,863,655 | 9/1989 | Lacourse et al. ................. 264/53 |
| 4,957,754 | 9/1990 | Munk et al. ................... 426/138 |
| 5,095,054 | 3/1992 | Lay et al. .................... 264/328.14 |

FOREIGN PATENT DOCUMENTS

| | | |
|---|---|---|
| 0118240 | 9/1984 | European Pat. Off. . |
| 205273 | 12/1986 | European Pat. Off. . |
| 265745 | 5/1988 | European Pat. Off. . |
| 271853 | 8/1989 | European Pat. Off. . |
| 370913 | 5/1990 | European Pat. Off. . |
| 405146 | 1/1991 | European Pat. Off. . |
| 2642731 | of 1990 | France . |
| 576055 | 7/1943 | United Kingdom . |

OTHER PUBLICATIONS

Chem. Abstract, vol. 107, 1987, p. 107.
Chem. Abstract, vol. 96, 1982, p. 574.

*Primary Examiner*—Allan R. Kuhns
*Attorney, Agent, or Firm*—Collard & Roe

[57] ABSTRACT

To produce rottable thin-walled shaped bodies, such as cups, plates, trays, and the like, which have a high mechanical stability, in a baking process which is similar to that used to produce edible wafers, it is proposed in accordance with the invention to use a substantially fat-free baking composition, which in addition to water contains as a major component a high-starch product, preferably a starch, and as release agents contains fatty acids having chains of medium or long length and/or their salts and/or their acid derivatives. In addition to said compounds or to replace them in part or sometimes entirely it is possible to use polyhydrogensiloxanes. The baking compositions may also contain thickening agents, fillers, humectants, coloring materials, structure-consolidating agents, preservatives and antioxidants. The baked products are finally conditioned to adjust them to a moisture content from 6 to 22% by weight.

53 Claims, 1 Drawing Sheet

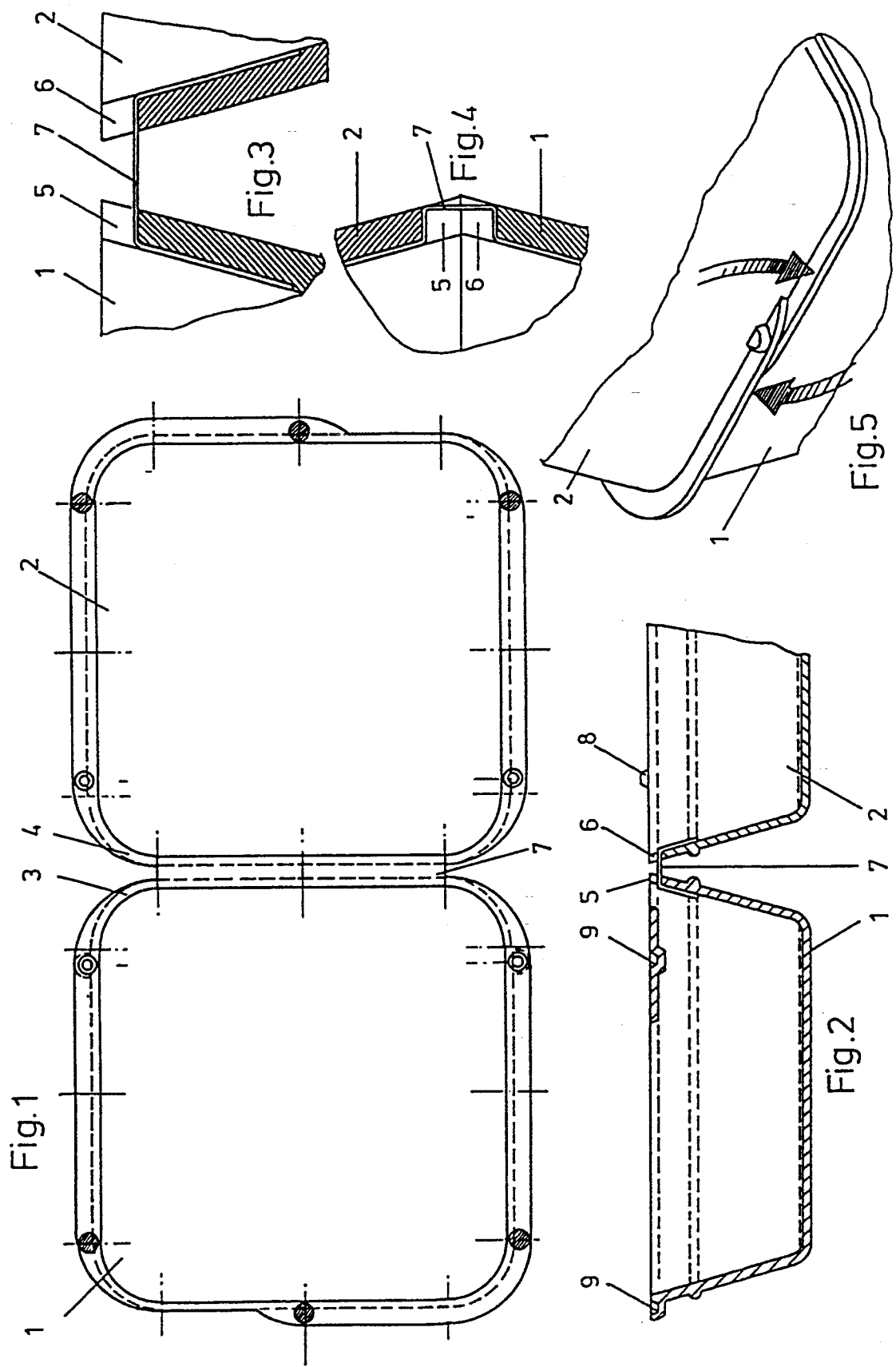

PROCESS OF PRODUCING ROTTABLE THIN-WALLED SHAPED BODIES MADE OF STARCH

This invention relates to a process of producing rottable thin-walled shaped bodies, in which a baking composition made of starch is applied to the lower mold half of a composite, preferably bipartite, mold, the closed mold is heated to bake the shaped body, and the baked product is subsequently conditioned.

The process in accordance with the invention can be used to make, e.g., the following shaped bodies: Cups, plates, fast-food packages, package inserts, so-called trays, paper- and cardboardlike sheets and webs-e.g. for use as insert sheets in boxes of chocolates-or for retaining lumps in packages or as a basic material for composite materials to be used for packaging, e.g., as more or less regularly shaped small bodies for use in combination with plastics, e.g., as a filling material for protecting packaged goods against shocks, like the known Styropor chips.

For the purposes of the present invention the term "thin-walled" indicates the thickness of a wall which resists fracture and cracking in its intended use and which can still be baked between two mold halves on conventional automatic wafer-baking machines (see, e.g., U.S. Pat. Nos. 4,438,685 and 4,648,314 and Published German Patent Application 3,346,970).

Those products of the above-mentioned kind which are presently on the market consist mainly of plastic and/or paper and are made from a raw material consisting of petroleum or wood. Rapidly growing plants, such as starch or oil plants, have not yet been used as a main raw material for making such products, which in a broader sense might be described as packaging materials. For instance, plant starches, plant oils and plant fats are globally available as industrial raw materials beyond nutritional requirements.

Specifically, starch is an interesting starting material, which can be reacted to swell and to be cross-linked and can be heated in physical and chemical processes to form consolidated structures, such as are known from baked products, e.g., in the crust of bread.

In the field of durable baked products, edible wafers made in the form of sheets (flat wafers, paper-thin wafers), cornets, cups, etc. constitute products which may be used for packaging functions, e.g., for ice cream, but owing to their typical properties-they are crisp, fragile, brittle and susceptible to moisture and to oxidation-cannot comply with several essential requirements to be met by a package as regards stability and protective function.

Edible wafers are made in accordance with various recipes, which are known from the patent literature and the technical literature (see, e.g., DE 17 82 502; DE 29 29 496; DE 32 39 871; P.E. Pritchard, A. H. Emery, D. J. Stevens (1975) The Influence of Ingredients on the Properties of Wafer Sheets in FMBRA Report No. 66; D. J. R. Manley, Technology of Biscuits, Crackers and Cookies, Ellis Horwood Limited, 1983, pages 222 et seq.; E. Winter, CCB Rev. Chocolate, Confectionary & Baking, 5 (3), 19; (1980).

In the recipes for the baking of wafers, wheat flour and water are called for in major amounts in addition to a number of minor ingredients, which are essential for the making of that product:

Leavening: Sodium hydrogen carbonate is used in an amount of 0.2 to 0.8% of the flour employed. Part of it may be replaced by ammonium hydrogen carbonate, or yeast may also be used.

Fats: Fats/oils must be used in an amount of 1 to 3% based on the amount of flour in order to facilitate the removal of the wafers from the baking mold (release agent). Magnesia is also sometimes recommended for that purpose but owing to its basic nature may give rise to problems regarding the stability of the baked products.

Lecithin: Lecithin is used in the making of wafers as an emulsifying agent and when used in a larger amount may also be regarded as a release agent.

In such recipes, oils and fats are used mainly not for reasons of taste but are required to prevent a sticking to the baking mold. Lecithin also facilitates the removal from the mold and emulsifies the oil/fat content in the aqueous wafer-baking composition.

The last-mentioned ingredients fat and lecithin are often introduced entirely or in part in the form of egg powder, milk powder or soybean flour meal. Such additives will also influence the structure, color, and taste of the wafers. This is also true for optionally employed contents of sucrose and/or glucose (0 to 3% of the flour content). Salt is used as a spice in an amount of 0 to 0.6% based on flour.

Other optional ingredients are, e.g., whey powder, flavors or coloring materials.

The mixed baking composition is baked, as a rule, for about 1.2 to 3 minutes when the baking plates are at a temperature of 160° to 180° C.

Owing to the leavening, which causes the low fat content to be distributed over a very large surface area, such wafers have a porous structure so that the unpackaged wafers become rancid very soon as a result of the oxidative cleavage of fats under the influence of light and atmospheric oxygen within days to weeks.

Light-colored and white paper-thin baked wafers are made from baking compositions in which wheat flour has been replaced in part or entirely by starch materials, such as cereal starch and potato starch. In that case a sticking to the baking molds must also be prevented by the use of oil/fat as a release agent, which in most cases must be used in a higher concentration than in normal wafer baking compositions, or the surfaces of the baking molds must be specially finished, e.g., polished and/or chromium-plated. Release oils, paraffins or waxes are laternatively used to treat the baking mold. But this gives rise to difficulties in the release of water vapor and often results in poorly shaped products.

During the baking process the starch is gelatinized so that the structure is consolidated.

The gluten contained in the flour employed will bind water contained in the baking composition and during the baking process will be denatured and cross-linked in the wafer structure and will thus contribute to the strength and texture of the product.

In the making of wafers, the structure of the product will mainly depend on the consolidation by the protein and by the partial gelatinization of the starch.

That gelatinization begins at about 60° C. and can be performed only in the presence of free water. Unless sufficient water is present, the temperature required for gelatinization initially rises continuously and the gelatinization is finally terminated.

In parallel to the requirement of water for the gelatinization the heating during the baking process will result in an increasing evolution of vapor, by which the amount of water which is available quickly decreases but which is of high significance for the loosening of the wafer product and for the formation of its porous structure. As the concentration of fat in the composition increases, increasingly larger amounts of the grains of starch will be coated with fat and said hydrophobic particles will render the evaporation more difficult and will result in an intermittent and often irregular loosening and in a poor surface finish of the wafer products to be baked. The use of lecithin will oppose said effects.

The known production processes are not able to eliminate the adverse effects of the baking fat on the structure and to oppose the changes in odor and taste which are due to hydrolyzing and oxidizing processes during the time in which the products are used.

In wafer products said rapidly ensuing changes in odor and taste are delayed by a dense and light- and air-impermeable package and—at least for the consumer—are masked for some time by the pleasant as-baked flavor which is present. These changes are mainly due to three components of the composition:

1. The added fat: In that respect an improvement can be achieved by the use of only saturated fats so that the durability of the wafer products can be increased by 50 to 200%. But unsaturated fats are contained also in the flour.

2. The lecithins used as an emulsifying agent contain also unsaturated fatty acids. Whereas the amount in which lecithin is added (as such or in other ingredients, as described hereinbefore) may be decreased, this will render the technological processes of the baking operation more difficult and will result in a poorer quality of the resulting product.

3. Alkaline leavening substances will increase the pH value so that the above-mentioned changes will be promoted.

Surprisingly it has been found that the use of fatty acids having medium or long chain lengths and/or of their salts and/or acid derivatives will permit a baking of waferlike products without any addition of fat and lecithin and in most cases without any leavening.

This is the more surprising because experiments with substances having similar release properties, such as waxes and paraffins, which are often used as release agents, have not given satisfactory results.

It has also been found that polymethylhydrogensiloxanes may be used in addition to or may partly and in some cases entirely replace the above-mentioned release agents.

Preferred polymethylhydrogensiloxanes have the general formula

wherein R stands for H, methyl or alkyl and, if R is methyl, n is a number between about 40 and about 100.

For this reason the process of the kind defined first hereinbefore is characterized in that in order to produce a product which is tough and strong and has a high mechanical stability 1) a baking composition is used which is substantially fat-free and has been prepared from the following ingredients:
   a) 30 to 63% by weight, preferably 42.0 to 58.0% by weight, water;
   b) as a starch basis 27.0 to 69% by weight, preferably 36 to 56.5% by weight, particularly 44 to 49% by weight, of a starch or a mixture of different starches and/or a flour or flour mixture;
   c) as a release agent 0.04 to 11% by weight, preferably 0.2 to 4.5% by weight, of one or more fatty acids having medium or long chain lengths and being optionally substituted and/or of their salts and/or of their acid derivatives, such as acid amides; said components may optionally be supplemented or replaced in part or, in individual cases, entirely replaced by 0.5 to 6.5% by weight, preferably 0.1 to 4.2% by weight, polymethylhydrogensiloxanes, and where both groups of compounds are used in conjunction with high concentrations of fatty acids the concentration of polymethylhydrogensiloxanes should not exceed 3% by weight, as a rule;
   d) 0 to 10% by weight, preferably 0.1 to 7.5% by weight, of a thickening agent, particularly 1.0 to 5.5% by weight dried gelatinized starch, pregelatinized starch or waste baked products, and/or 0 to 2% by weight, preferably 0 to 1.0% by weight, guar meal, pectin, carubine, carboxymethyl cellulose and/or 0 to 5.5% by weight, preferably 0 to 3% by weight, gum arabic;
   e) 0 to 16.0% by weight, preferably 0 to 11% by weight, high-cellulose raw material, in case of pulp up to 26.9% by weight and/or other plant fibers and/or fibers of plastic, glass, metal, carbon and others;
   f) 0 to 10% by weight, preferably 0 to 7.5% by weight, non-fibrous fillers, such as calcium carbonate, coal, talc, titanium dioxide, silica gel, alumina; 0 to 3% by weight, preferably 0 to 2.5% by weight, shellac;
   0 to 2.0% by weight, preferably 0 to 1.0% by weight, soybean protein, wheat gluten powder, chicken protein powder, casein powder, caseinate powder;
   g) as a humectant
   0 to 3.5% by weight, preferably 0 to 2.5% by weight, common salt and/or
   0 to 2.5% by weight, preferably 0 to 1.5% by weight, glycerine, glycols and/or
   0 to 4.5% by weight, preferably 0 to 3.5% by weight, sorbitol;
   h) as a coloring material
   0 to 10% by weight, preferably 0 to 7.5% by weight, inorganic pigments and/or
   0 to 0.1% by weight natural and synthetic dyestuffs and/or
   0 to 2.5% by weight, preferably 0 to 1% by weight, sugar color and/or
   0 to 1% by weight carbon blacks and/or
   0 to 3.5% by weight, preferably 0 to 2.5% by weight, cocoa powder;
   i) as a structure-consolidating agent a zirconium salt solution, preferably as an alkaline solution of ammonium zirconium carbonate, the amount of zirconium compounds expressed as $ZrO_2$ amounting to 0 to 0.1% by weight, preferably 0.01 to 0.05% by weight;
   k) 0 to 0.25% by weight, preferably 0 to 0.1% by weight, preservatives; and
   l) 0 to 0.5% by weight, preferably 0 to 0.1% by weight, antioxidants;
2) the baking composition filling the mold is baked at 145° to 230° C. for 25 to 230 seconds; and 3) the resulting product is conditioned to contain 6 to 22% by weight moisture.

The action of the above-mentioned fatty acids and/or their salts and/or their acid derivatives and/or the above-mentioned polysiloxanes as additives instead of the above-described fats/oils and/or emulsifying agents, which additives permit the production of a baked product having the mechanical properties to be described hereinafter, is independent as far as the fatty acids are concerned of the degree of saturation of the fatty acids used but can preferably be stated with saturated and/or monounsaturated fatty acids and hydroxyfatty acids.

But it is noted that the high oxidation resistance of the product to be described hereinafter will particularly be achieved with saturated fatty acids.

The fatty acids employed have chains of medium or long length with a chain length preferably in excess of C12, particularly C16 and C18.

The term "fatty acid having chains of medium or long length" includes the chain length distributions typically obtained in the production of such acids from plant fats and animal fats. This means that, e.g., the term "stearic acid" means that the major component is stearic acid but the usual fatty acid spectrum of, e.g., hardened plant oils and plant fats is also present, which includes fatty acids having shorter or longer chains, as well as minor amounts of the corresponding unsaturated fatty acids.

The stated effect is also achieved with salts of the fatty acids, preferably of stearic acid, particularly with the stearates of calcium, magnesium, aluminum, and zinc.

The presence of the described fatty acids and/or their salts and/or their acid derivatives permits the production of shaped products with use of various high-starch raw materials.

It has already been mentioned that the fatty acids and/or their salts and/or their acid derivatives may optionally be replaced by polymethylhydrogensiloxanes.

In view of his or her knowledge a person skilled in the art was bound to expect that at temperatures in excess of 120° C. the use of said polysiloxans will involve a formation of covalent bonds with OH groups, e.g., of the starch. This will result in a hydrophobic surface, e.g., on the grains of starch, so that the evaporation and the formation of a gelatinized starch matrix will be opposed.

But surprisingly said polysiloxane will not oppose the disintegration of the structure of the grains of starch during the baking process, and that disintegration can be detected with an electron microscope and will result in the formation of a continuous starch matrix. The matrix is even slightly consolidated and in the case of a siloxane concentration in the lower part of the stated range between 0.05 and up to 2% by weight a certain release action will be effected, which will facilitate the removal from the mold. That effect may be due to the binding of soluble components of the baking composition, which are responsible for the sticking.

But the simultaneous cross-linking of the polysiloxanes and their partial hydrolysis by the vapor which is present at an elevated temperature will particularly in the case of concentrations above 2% by weight oppose the removal from the mold, particularly in case of high concentrations of polysiloxane. Boundary layers will be formed on the baking mold and after repeated baking cycles will cause the shaped bodies to stick to the baking mold. That effect may be opposed by the co-use of the above-defined fatty acids and/or their salts and/or their acid derivatives.

From the above it is apparent that the fatty acids and/or their salts and/or their acid derivatives are preferably used as release agents within the scope of the present invention.

In the making of wafers and in related baking operations, leavening agents, such as sodium hydrogen carbonate, will promote the loosening of the baked products by the water vapor.

The products become more porous, lighter in weight, and more fragile. In the process in accordance with the invention the co-use of leavening is not essential and will produce only a slight loosening effect. The porosity of the products can be controlled by the control of the water content alone and will result in a material having a density in the range of 0.08 to 0.38 g/cm$^3$, preferably of 0.12 to 0.30 g/cm$^3$.

If a higher porosity is desired for certain reasons, this can be achieved by an addition of leavening only to a restricted degree in case of starch recipes (no cereal flours).

The expression "substantially fat-free baking composition" used in the definition of the invention means that fat or oil is not added to the baking composition, which contains only the fat which is introduced by the starch base.

For instance, starch of potatoes, corn, tapioca, rice, and wheat contains less than 0.6% by weight fat and type 550 wheat flour and type 997 rye flour contains less than 1.4% by weight fat.

In addition to the fatty acids described in detail and their salts and derivatives and the polysiloxanes used to make oxidation-resisting products and as agents used instead of conventional fats and emulsifying agents to promote the structuring of the product and its removal from the molds in the machines, the following raw materials are required or may be used to make the products to be produced in accordance with the invention:

water
starch or high-starch raw materials
thickening agents
fibrous materials, preferably high-cellulose solids
humectants
coloring materials
preservatives
antioxidants As has been mentioned hereinbefore, 30 to 63% by weight water are added to the baking composition in the process in accordance with the invention. That value does not include the "combined" water which is introduced by additives with the exception of additives which have a very high "free" water content, such as pulp.

Under the usual conditions of production and storage, the raw materials used in the process in accordance with the invention have a natural equilibrium moisture content, with which they generally have a particularly long shelf life.

This relates mainly to water, which has no or a highly reduced dissolving power and significantly differs from free water, e.g., also as regards its mobility and its evaporation and freezing behavior. (Water of constitution, vicinal water, stratified water, according to O. FENNEMA "FOOD CHEMISTRY", 2nd edition, Marcel Dekker, New York, 1985, pages 23 et seq.).

A removal of that water content by correspondingly severe drying conditions will result in irreversible changes of the properties of the materials. This is specifically true for the main raw materials, the polysaccharides, where pronounced hysteresis phenomena can be detected by a comparison of the adsorption and desorption isotherms.

For this reason it is not necessary and does not make sense to use specially dried raw materials or materials adjusted to a specified water content in the process in accordance with the invention.

The following Table indicates the water contents of the raw materials which are used in the recipes, generally as a powder.

|  | Water content (% by weight) |
| --- | --- |
| Potato starch | 15.5 to 18.6% |
| Corn starch | 12.6% |
| Wheat starch | 13.5% |
| Tapioca starch | 12.4% |
| Rice starch | 13.8% |
| Corn amylo starch | 14.4% |
| Pea starch | 11.4% |
| Wheat flour | 12.2 to 14.6% |
| Rye flour | 14.2% |
| Dried gelatinized potato starch | 10.0% |
| Dried gelatinized corn starch | 5.0 to 7.0% |
| Guar meal | 4.0% |
| Carboxymethylcellulose | 7.0% |
| Pectin | 7.0 to 10.0% |
| Cellulose | 6.0 to 10.0% |
| Straw | 7.2% |
| Bran | 13.1% |
| Flax | 9.4% |
| Chopped beetroots | 8.7% |
| PHB | 0.3% |
| Mg stearate | 3.5% |
| Calcium stearate | 2.0% |
| Talc | 0.1% |
| $TiO_2$ | 0.2% |
| $Al_2O_3$ | 4.6% |
| Silica gel | 1.0% |
| Coal (norite) | 10.0% |
| Acetylcellulose | 4.3% |
| Caseinate | 7.4% |
| Casein | 9.0% |
| Soybean protein | 6.0% |
| Chicken protein powder | 8.5% |
| Wood meal | 17.0 to 36.0% |
| Starch slurry | 61.7%; 57% |
| Pressed pulp | 84.0% |

Doughs are usually not cohesive if they contain less than 40% by weight water; they are usually plastic if they contain less than 44% by weight water and they are usually flowable to highly flowable if they contain more than 45% water.

But said limits will depend on the binding of the water of the high-starch raw material employed and on the concentrations of the thickening agent and of the high-cellulose raw material.

As is apparent from the recipes stated hereinafter, a major amount of the solids called for by the recipe consists of starch and/or high-starch raw materials. To achieve an adequate mechanical strength, starches which will exhibit a high viscosity increase and, as a result, a high consolidation, at the beginning of the gelatinization, such as potato starch, will be preferred. Potato starch will be preferred, particularly in amounts between 10% and 100%. But that starch content may alternatively be provided by other starches, particularly wheat starch or rice starch, or by flours, particularly wheat flour.

The most important function of high-starch raw materials in the production process is the structuring by swelling, gelatinization and cross-linking. These processes will be highly influenced by the structure of the starch grains, specifically by the manner in which the amylose is included in the amylopectin matrix the extent and the manner of the escape of amylose ionic and non-ionic accompanying substances Particularly the complexing of the amylose by lipis and other properties which are due to the anylose fractions will be more significant where cereal starches are used and in some cases may result in a partial weakening of the structure of the shaped bodies and in a formation of cracks.

For this reason potato starch and tapioca starch as well as corn starch are preferred to, e.g., wheat starch, wheat flour, rice starch.

In practice the use of 100% potato starch, tapioca starch or corn starch is preferred. The use of pure cereal flours and of pure rice starch, wheat starch, corn amylo starch or waxy corn starch is less desirable.

As will be shown in individual illustrative recipes, a desirable effect of the release agent can also be obtained with flours alone, without a use of starch, provided that 1. the lower oxidation resistance is tolerated or is increased by an addition of antioxidants;
2. the release agent content is increased or the flour content is decreased by a diluent (cellulose, starch);
3. as is shown in Recipe No. 64, a pasty, doughlike baking composition is employed.

The use of non-flowable compositions of cereal flours will reduce the extraction of soluble flour components, which are responsible for the sticking. This will decrease the amount of release agent required.

The production of the products in accordance with the invention depends on the use of homogeneous compositions for the primary molding process. To avoid a sedimentation of the raw material particles employed, particularly of the starch, it is desirable to co-use a thickening agent. Various additives, known per se, are suitable for that purpose:

1. Gelatinized starches and starch-containing products which can be prepared as finished products, such as dried gelatinized starches or dried gelatinized flours, or by a gelatinization immediately before the baking compositions are prepared. As a rule, between 1 and 10% by weight of the total starch content should be gelantinized. The optimum is between 2 and 5% by weight in dependence on the kind of starch or flour.
2. As an alternative, conventional gelling and thickening agents may be used, preferably guar seed meal, carubine meal, carrageen, pectin, modified starches and carboxymethylcellulose. The concentration should be between 0.1 and 1.0% by weight, preferably 0.3 to 0.8% by weight, based on the starch content.

Agents stated sub 1. and 2. may also be used in combination.

The sedimentation of the starch grains in flowable baking compositions may also be prevented by an intense stirring before the feeding. The use of thickening substances will be technologically desirable for an undisturbed processing of baking compositions which as high-starch raw materials contain pure starches or in addition to cereal flours contain more than 4% by weight starch.

Besides, the use of thickening agents in plastic or non-cohesive baking compositions is not excluded.

As regards strength, the properties in use of the products to be made will be improved by the co-use of fibrous raw materials (natural fibers, synthetic fibers, glass fibers), particularly by the co-use of high-cellulose raw materials. Cellulose, bran, straw, beetroot fibrous materials and wood chips will be preferred.

Cellulose is desirably used as a substantially dry fiber having fiber lengths between 30 and 1500 micrometers or as raw bleached and unbleached raw pulp. Raw pulp will have to be properly defibrated for a substantially homogeneous distribution in the baking composition.

In many cases, non-fibrous fillers may desirably be added to the baking compositions instead of or in addition to the above-mentioned fillers.

Such fillers have no primary structuring function but owing to their hardness, their binding in the starch matrix or a specific interaction with starch may have a hardening or stiffening effect. Besides, the baking composition may be diluted or the structure of the baking composition and of the shaped bodies may be stabilized thereby.

The examples of such fillers stated hereinbefore in the definition of the invention and in the following recipes are representative of the large number of known filling and reinforcing agents. For instance, coal may be used in the form of graphite, carbon black, activated carbon, carbon fibers.

Silica gel as precipitated $SiO_2$, quartz meal and chemically related substances, such as glass meal, glass fibers, silicates, kaolin, talk, mica.

Mainly by their surface-activating action the stated proteins will mainly influence the impact behaviour and the texture of the baking compositions and in addition thereto will exert favorable influences on the uniform pore structure of the shaped bodies.

The adjustment of the moisture content of the product described in step 3) of the production of the products mentioned first hereinbefore may be assisted by the use of humectants, known in other fields, for the control and the maintenance of said moisture content.

The color of the packaging products is initially determined by the color of the raw materials and by possible influences of a baking process and is modified by the co-use of dyestuffs, pigments or fillers which are soluble in aqueous fluids or can homogeneously be distributed. Fillers will influence the surface finish and the specific gravity of the product in known manner (see the recipe examples 53 to 59).

1. Inorganic color pigments:
The pigments may be used in a concentration of up to 10% by weight, preferably up to 7.5% by weight.

2. Dyestuffs:
   a) Natural dyestuffs having a high coloring power; preferred are water-soluble natural dyestuffs, such as annato (bixin), chlorophyll, chlorophyllin, carmine, papricaoleoresin. In dependence on the coloring power of the dyestuff, its concentration is desirably less than 0.1% by weight.
   b) Carbon blacks, coal: Activated carbon is used in concentrations of 0.0001 to 1% by weight for gray shades. Higher concents as fillers have already been described.
   c) Synthetic dyestuffs having a high coloring power are preferred dyestuffs, particularly water-soluble ones. They are used in a concentration below 0.1% by weight. Typical dyestuffs of that class are, e.g., Yellow-orange S, Erythrosin I, Indigoton I, Fast Green FCF, Allura Red 40, Patent Blue AE.
   d) Sugar color and cocoa powder may be mentioned as other organic coloring materials, particularly as foodstuffs and foodstuff additives.

Annato, chlorophyll and activated carbon are often used in practice.

It is intended to improve the stability of the products by the co-use of antioxidants and preservatives (see recipe examples 33, 34).

Preferred preservatives are those which are active at neutral or slightly acid pH values, preferably such substances which are approved for use in foodstuffs, particularly PHB esters, in concentrations of 0 to 0.25% by weight, the methyl, ethyl and propyl esters of p-hydroxybenzoic acid and their alkali salts as well as antioxidants approved for use in foodstuffs, particularly esters of gallic acid, in concentrations of 0 to 0.5% by weight, preferably 0 to 0.1% by weight.

All substances usually employed in the production of packaging materials for foodstuffs may selectively be employed.

To consolidate the structure of the shaped bodies to be produced, zirconium compounds may also be added to the baking composition in the process in accordance with the invention.

Because zirconium as Zr(IV) having the preferred oxidation number has a small ion radius, it will strongly tend to effect a coordination with ligands, which in an aqueous medium consist of hydrates having a polymeric structure. Their size and charge will depend, inter alia, on the concentration of zirconium, on the pH value and on the kind and concentration of other ions present.

Possible structures and charge conditions are schematically represented by the following image CATIONIC - zirconium oxychloride
zirconium nitrate

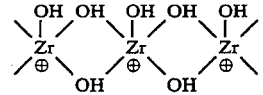

ANTIONIC - ammonium zirconium carbonate
- zirconium orthosulfate

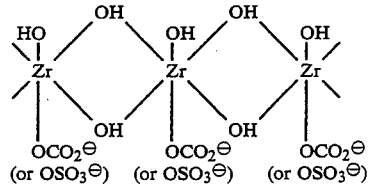

NEUTRAL - zirconium acetate

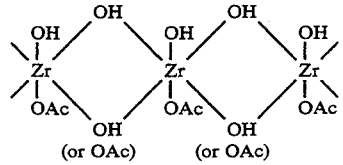

An increasing dilution or a higher pH value will result in an increase of the size of the polymer by a larger number of hydroxy bridges until zirconium hydroxide is precipitated. For this reason the degree of that hydrolysis can be influenced. Zirconium has a high affinity to oxygen-containing species and ions, which control the nature of the zirconium species in solution. Specifically, there will be an interaction with oxygen-containing groups on organic polymers, such as starch.

Ammonium zirconium carbonate and its formulation stabilized with tartaric acid (Bacote 20, Magnesium Elektron) are particularly effective as aqueous solutions having pH values of about 9.5. The anionic zirconium polymers in solution with ammonium cations are stabilized by the carbonate but will be decomposed during drying and will be cross-linked by hydroxyl groups of the starch. The reaction rate is higher under alkaline conditions and substantially decreases the concentration (calculated as $ZrO_2$) required for an effective cross-linking.

This has been shown in experiments with various zirconium compounds.
1. Zirconyl chloride (5 g in 100 g ethanol)
2. Zirconium propionate (4 g in 100 g ethanol)
3. Zirconium carbonate (5 g in 0.1% acetic acid)
4. Zirconium carbonate, solid powder
5. Zirconium propionate, solid powder
6. Ammonium zirconium carbonate solution (20% $ZrO_2$), pH 9.5 (AZC, Magnesium Elektron)
7. AZC solution like 6., stabilized with tartaric acid (Bacote 20, Magnesium Elektron)

Recipe No. 76 was used as a base for said various test preparations with correspondingly varied additions of the Zr salt. The following information on effectiveness is based on the $ZrO_2$ content to permit a comparison. Results:
ad 1. Slight consolidation at and above 0.04% by weight $ZrO_2$
ad 2. Slight consolidation at and above 0.06% by weight $ZrO_2$
ad 3. Slight consolidation at and above 0.05% by weight $ZrO_2$
ad 4. No consolidation
ad 5. No consolidation
ad 6. Slight consolidation at and above 0.005% by weight $ZrO_2$
ad 7. Slight consolidation at and above 0.005% by weight $ZrO_2$ The experiments show that shaped bodies having a particularly strong structure can preferably be made under alkaline conditions with the reagents mentioned sub 6. and 7. (presence of anionic polymer species in the reagent). The concentration range from 0.01 to 0.03% by weight $ZrO_2$ is considered preferable for the described shaped body recipes. Higher contents are not excluded, on principle, but in most cases will result in a consolidation to degrees which no longer permit an undisturbed shaping. The preferred baking temperature for shaped bodies made with Zr compounds is between 180° and 210° C.

It has surprisingly been found that the polymethylhydrogensiloxanes mentioned hereinbefore in conjunction with the release agent will increase also the strength of the shaped bodies manufactured in accordance with the invention.

The formation of the structure of shaped bodies depends essentially on the gelatinization of starch. If sufficient water is not available, the gelatinization will be stopped. It has surprisingly been found that it is possible to make not only flowable and pasty-dough compositions but raw materials mixtures which are no longer cohesive and appear to be powdery-lumpy may also be used to manufacture shaped bodies, which in the latter case will be heavier in weight.

In that case the water content lies in the lower part of the claimed range. As a result, high-starch raw materials and non-starch components will be used in larger amounts. That content of high-starch raw materials may be as large as 69.0% by weight and, e.g., preferably amounts to 49.5% by weight in case of wheat flour and to up to 49.1% by weight in case of corn starch.

As has been mentioned hereinbefore the gelatinization of starch is an essential reason for the stable structure of said shaped bodies. The starch of the high-starch raw material gelatinizes during the heating and drying step.

Other non-starch constituents (NSC) of the recipes are included in said structure as it is formed. Owing to the mixing of the raw materials before they are charged into the mold and/or owing to the specific shape and nature of said NSC (e.g., fiber structure, porosity, structured surface, chemical affinity for non-covalent interactions) said NSC constitute a substantially homogeneously distributed solid constitutent of the three-dimensional structure of the shaped bodies.

Where such NSC are used, the strength will be decreased owing to the dilution of the cross-linking starch (filler action) and the structure will be consolidated.

Such NSC if used will act to reduce the strength owing to the dilution of the cross-linking starch (filler action) and to consolidate the structure (binder action), e.g., in the case of fibrous materials and cross-linking constituents.

This means that the use of NSC is limited only by:

A possible toxicity. This means that in the intended use of the shaped bodies and during their proper further processing or utilization after use any NSC must not yield pollutants or act as a pollutant.

An upper concentration limit because they will dilute the structure-forming starch as discussed.

An influence on the manufacturing process in accordance with the invention by an inhibition or undesired modification of the reactions being performed.

A number of NSC are mentioned in the recipes. In a concentration of more than 1%, non-starch dry solids may be contained in various recipes as
release agent
thickening agent
humectant
high-cellulose raw material
filler Regarding the group of substances used for purposes which can exactly be defined in the manufacturing process—as in the case of the three agents mentioned first——and of the two last-mentioned ones, which rather act as a filler and/or binder, as discussed hereinbefore, a number of further examples may be mentioned.

| Calcium carbonate | 0.1 to 17.2% by weight, preferably 0.4 to 13.2% by weight; |
| --- | --- |
| Talc | 0.1 to 12.5% by weight, preferably 0.4 to 9.5% by weight; |
| Acetylated cellulose | 0.1 to 14.1% by weight, preferably 0.4 to 11.7% by weight; |
| Alumina | 0.1 to 12.5% by weight, preferably 0.4 to 9.5% by weight; |
| Activated carbon | 0.1 to 12% by weight, preferably 0.4 to 9.5% by weight; |
| Shellac | 0.1 to 5% by weight, preferably 0.4 to 3.5% by weight; |

-continued based on the dry solids in the baking composition.

Each of said substances is used in the form of a powder.

Owing to its porous surface structure, activated carbon will effectively be incorporated in the starch matrix and will favorably influence the indentability of said matrix and its deformation resistance when it has been moistened. The requirements to be met by the activated carbon will become apparent in view of the above-mentioned toxicological aspects, e.g., as regards the restriction of the content of inorganic components and/or of zinc in dependence on the intended use. Particle sizes below 150 micrometers have been found to be most suitable for a visually homogeneous distribution. Granulated activated carbon (sieve fraction 0.125 to 0.5 mm) will form distinctly visually defined particles in the structure of the shaped body but is not excluded for that reason. A special activity stage or porosity of the coal and a restriction to its production from specific raw materials are not required.

Shellac is a hard, tough, and amorphous resin, which has a high adhesive strength and a high abrasion resistance. The use of shellac in the raw materials mixture will consolidate the shaped bodies owing to the film-forming and priming properties.

The porosity of known products made by baking can be achieved by various processes, which basically loosen the baking composition or effect a loosening during the baking. Both principles are used in most cases. The most important loosening processes are:

Mechanical loosening, e.g., by whipped-in air;
Chemical loosening by so-called leavening agents;
Physical loosening, e.g., by water vapor.

In the manufacture of comparatively thin-walled products such as wafers, loosening is effected by water vapor (see W. Seibel et al: Getreide, Mehl, Brot 32, 188, 1978). It is not usual to ship the wafer baking compositions.

Surprisingly it has now been found that in spite of the large volumes of water vapor which flow during the baking process through the material of the shaped bodies as its structure is formed, a mechanical loosening of the baking composition will result in uniformly finely porous materials and will contribute to an unproblematic manufacture of the shaped bodies even in shapes having intricate details.

The following actions are required to manufacture shaped bodies having a higher number of air pores, i.e., a more foamlike structure:

1. The introduction of air and/or other gases by stirring, whipping or pressure (mechanical action) or by a chemical action to release loosening gases ($CO_2$, ammonia);
2. the provision of substances which are effective at the surfaces of the pores and are introduced into and increase and/or ensure the stability of the structure (example: sugar and chicken egg protein).

Various protein sources, such as chicken egg protein, soybean protein and various milk protein sources are well suited for the formation of that wall structure.

For that purpose the following protein sources, individually or in combination, are added to the baking composition (statements in % by weight dry solids in the baking composition):

Casein 0.1 to 2.6%, preferably 0.2 to 1.3%;
Sodium caseinate 0.1 to 1.3%, preferably 0.2 to 1.0%;
Soybean isolate 0.1 to 2.6%, preferably 0.2 to 1.7%;
Chicken egg protein 0.1 to 1.7%, preferably 0.2 to 1.0%.

To increase the stability of the pores until the use of the baking composition or to ensure it over longer standing times or to form even finer pores, whipping emulsifying agents are used. For this reason whipping agents which ensure a higher stability and a higher volume of the resulting foam in addition to the above-mentioned protein components and fillers and/or vehicles (sorbitol, maltodextrin, starch) contain emulsifying agents of the following groups of substances: monoglyceride and their esters, polyglycerine esters, propyleneglycol esters or sorbitan esters and/or mixtures thereof (examples: Spongolit, Grünau; Delipan, Bender & Co.).

The baking composition for the process in accordance with the invention is prepared as follows:

Water-soluble components and pulverulent minor components are stirred into the required amount of water with vigorous mixing. The use of a dry premix specifically of the thickening and release agents, optionally with 5% by weight of the amount of starch and/or flour, is recommendable to avoid a formation of clumps or difficulties regarding the wetting of the release agent. Thereafter the flour and/or starch is stirred in until a homogeneous suspension has been formed. Finally the release agent or—in the control examples—the fat in a liquid state is admixed.

In dependence on the recipe the compositions are adjusted by an addition of water preferably to a viscosity between 500 and 3000 mPa.s. In dependence on the initial temperature of the raw materials and the ambient temperature the baking compositions assume temperatures between 12° and 26° C.

The baking operation may be performed under the conditions under which edible wafers—i.e., those products which have been discussed in detail in the introductory part of this description—particularly if flour components are used as starch components. But it will be desirable and preferred to effect changes in two senses:
1. In the initial baking process after the feeding of the composition;
2. Regarding the changes of temperature with time during the baking operation.

ad 1. Initial baking process

It is desirable to raise and lower ("shuttle") the upper baking mold halves once or several times after the composition has been fed and before the baking mold is closed (1) for the final filling of the mold and (2) for the final baking of the product.

This will result in the following processes with the favorable results to be described hereinafter.

1.1 By the lowering of the upper half of the top half of the baking mold, the baking composition, which is fed to form in the baking mold a thick layer within a restricted space, can be distributed over a wider surface to form a thinner layer, which has approximately the same thickness as the final product and is initially heated thereby.

1.2 That heating results in a release of water vapor, which during the subsequent raising can directly escape through vapor exit openings without a detour. This will result in a faster drying so that the baking time will be shortened and the product will have a higher material density and strength.

1.3 The baking composition is distributed in the mold in a controlled manner with the following favorable results. After the first distribution by the lowering operation (1) and the resulting heating, the succeeding closing operation will cause the mold to be intermittently filled by an evolution of vapor. But owing to the raising and the escape of vapor in the meantime, less vapor is evolved than in case of an immediate closing. That slower filling of the mold may be controlled by the control of the duration of the lowering and raising and by the number of said movements. This may improve the release from details of the baking mold and in a faultless surface of the product.

The following ranges have been found to be desirable:

|  | Time |
| --- | --- |
| Lowered baking mold | 0.3 to 3 s, preferably 0.4 to 0.6 s |
| Raised baking mold | 0.3 to 10 s, preferably 0.4 to 0.7 s |
| Width of opening | 1 to 10 mm, preferably 1 to 4 mm | ad 2. Changes of temperature with time

A minimum of energy must be supplied for the baking process and will essentially depend on the energy required to heat and evaporate the water contained in the baking compositions. That energy supply may be controlled by the temperature of the baking mold and by the residence time in the mold. For this reason the temperature setting—between 145° and 225° C.—and the baking time—between 40 and 230 s—cannot be independently selected: lower temperatures will require a longer baking time and vice versa.

After the primary manufacturing step, in which the product is baked, the product is conditioned to adjust its water content so that the desired tough and strong texture of the product and its desired deformability and mechanical stability are achieved.

The lower limit of the water content is about 6% by weight. With a lower water content the product will become increasingly brittle and its mechanical load-carrying capacity will be decreased.

The upper limit of the water content is preferably at 16% by weight to reliably preclude the risk of microbial growth.

If the preservatives usual in the packaging industry are used too, a conditioning to a moisture content up to 22% by weight will be permissible.

Conditioning is effected in known manner in intermittently operated air conditioning chambers or in tunnel apparatuses. Cold vapor processes, hot vapor processes and an ultrafine atomization, e.g., by ultrasonic sound, may be employed and it must be ensured that films of moisture will not be formed on the surfaces of the products and that the water content will not increase above 22% by weight. An excess moistening will soften the structure and deform the product.

In the process in accordance with the invention for the manufacture of shaped bodies, a substantially isotropic baking composition is introduced into heated baking molds. Those constituents which are essential for the formation of the structure and any additives, fillers and adjuvants are uniformly distributed in the composition.

Said shaped bodies may alternatively be made as composites, in which prefabricated and preshaped materials, which are generally sheetlike and may possibly be threadlike, are bonded during the baking process to the structure of the body being formed thereby. Such sheet materials may consist of products manufactured by the process in accordance with the invention.

A first requirement for such a process resides in that the materials to be bonded are introduced at a predefined location of the mold and in a defined sequence in relation to the feeding of the basic composition for the body and that this is effected before the final closing of the mold (see examples). That introduction is effected before any shuttling.

The second requirement to be met for the use of such sheetlike or threadlike materials resides in that they must be stable, e.g., against melting under the baking temperatures employed.

The third requirement resides in that the largest thickness of the sheetlike or threadlike materials to be bonded must not exceed the clearance of the baking mold or the internal height of the baking mold or that they must be compressible to such a thickness.

The lower limit will be determined by the fact that such materials must be mechanically handled and that their production must be possible (films). The thickness of 12 micrometers stated for the film in the examples is no lower limit.

Examples of such materials:
1. Films or sheets:
   Paper, cardboard of any kind, i.e. materials made substantially of fibrous materials, mainly cellulose. Said papers may be colored or printed or specially finished.
   Plastic, polyethylene terephthalate and other temperature-stable materials.
   Aluminum
   Non-woven fabrics or mats, fibers Threadlike materials of glass, plastic, metal, natural fibers (e.g., various bast fibers, cotton, straw, etc.), which may be more or less regularly linked or cross-linked in another manner to form non-woven fabrics or mats.

The bonding of said materials to the body

Said materials are bonded to the body as it is made by baking at temperatures between 145° and 225° C. under the accompanying conditions: Peak pressures up to about 1.5 bars, release of a large volume of water vapor, gelatinization of the starch base.

The adhesiveness and bonding action of the sheetlike and/or threadlike materials which have been bonded are sufficient for the intended uses of the shaped bodies (such as plate, cup, tray, insert sheet, carrier, bar, spatula and related utensils) provided with such materials and do not depend on the presence of adhesives or other tacky materials or binders but are due to the adhesiveness and tackiness which result under the manufacturing conditions described in dependence on the surface finish (roughness, porosity) of the bonded materials.

The embodiments to be explained hereinafter are intended to illustrate the principle of the process in a non-restrictive manner.

I. Joining parts of shaped bodies to form a hinge.

A hinge between two parts of a shaped body is schematically shown in Fig. 1.

The formation of such hinge is not restricted to:
1. a joint between similar parts of a shaped body (similar in shape, size, color and other material composition);

2. the use of a single part or strip to be bonded; The joint may also be formed by a plurality of separate inserts consisting of strips or cords;
3. the introduction of a part which before the baking operation has been restricted to its final dimension; the bonded material may protrude and said protruding portion, which may optionally establish a joint to adjacent composites, is separated only after the manufacturing process.

As the baking mold is closed, the hinge material is fixed in position and in the intended regions is wetted and/or flown around by the baking composition and it is bonded in the shaped body by the baking operation.

BRIEF DESCRIPTION OF THE DRAWINGS

An illustrative embodiment of a product manufactured by the process in accordance with the invention is illustrated in the accompanying drawings, which show a baked shaped body for a folding container, which consists of two identical container halves, which are interconnected by a hinge.

FIG. 1 is a top plan view showing the completely baked shaped body as it is taken from the container-baking mold;

FIG. 2 is a sectional view showing the shaped body of FIG. 1;

FIG. 3 is an enlarged view showing the region of the strip hinge;

FIG. 4 shows the strip hinge when the two container halves have been folded against each other, i.e., when the folding container is closed; and FIG. 5 shows a portion of the closed folding container viewed from the outside.

The baked shaped body consists of two identical open-topped container bowls 1, 2, which when folded together constitute a self-contained folding container. The two container bowls 1, 2 are joined at their adjacent rims 3, 4 by a strip hinge 7, which is received in recesses 5, 6 and which consists of a sheet material, such as a strip, which has been baked with the container bowls which constitute the body. To prevent a displacement of the two container bowls when they have been folded together, interengageable elevations 8 and recesses 9 are provided on the adjoining end faces of the side walls of the container bowls 1, 2.

Modifications will be described in Examples 7 to 9.

Subject to the requirements mentioned hereinbefore regarding the nature of sheet materials bonded to the body, said materials cover portions of the inside and/or outside surface of the finally produced shaped bodies.

The evolution of water vapor during the baking process has the following results:

1. Sheet materials which have centrally been inserted with respect to the entire outside surface (bottom surface) of the body are bonded at the predetermined location and lie with sharp contours on the outside and no baking composition flows under them. The single requirement for that result is that the baking composition is subsequently also centrally introduced.
2. Sheet materials which are not centrally inserted with respect to the feeding of the baking composition and to the succeeding evolution of water vapor will be displaced and will not be bonded at a predefined location.
3. What has been said sub 1. and 2. is analogously applicable to the inside surface (top surface) of the body, provided that the baking composition is fed before the sheet material is inserted.

But it is surprising that the bonding of sheet material during the baking step of the manufacturing process may be effected throughout the top or bottom surface of the body material or throughout both surfaces.

In the experiments described in Examples 10 to 24 no problems have arisen as regards the through drying or through baking and as regards the shaping of the surface. Such problems might have arisen owing to the fact that the surfaces were covered with materials which are poorer conductors of heat so that the film coefficient of heat transfer is changed.

Before and/or after the feeding of the baking composition a correspondingly large piece of the sheet material is placed into the baking mold so that said sheet will partly or completely cover the top and/or bottom surface or may even protrude when the baking mold has been closed.

Very smooth and tension-resistant materials, such as films of polyethylene terephthalate, can be pulled off without destruction after the baking and in that case it will be possible to detect residues of adhering body material by electron-optical and microscopic examination or such residues may even be visible by the naked eye. This has been proved by examinations with a scanning electron microscope and shows that there is an intense interaction even with smooth sheet materials which have been bonded.

The unexpectedly easy manufacture of such composites which are covered on part of or throughout their top and bottom surfaces does not depend also in that case on the recipes which are disclosed for the shaped bodies. For instance, a recipe used in the manufacture of wafers is stated in Example 13.

If the body is covered throughout its top and bottom surfaces, it will be possible to manufacture products which are novel inasmuch as various restrictions known from the manufacture of edible wafers and similar baked products are no longer relevant.

This relates to the following:

1. The sticking to the baking mold caused by carbohydrates having a low molecular weight (such as sugars, sirups, polyols), which in dependence on the substance and its concentrations constitute particularly hard structures after the manufacture (see Example 18 using sugar) or which serve as a humectant and/or softness-maintaining agent, such as glycerine;
2. the use of fats, oils, and emulsifying agents, such as lecithin, as mold release agents;
3. special problems regarding the rapid spoiling of such baked products by oxidation, particularly owing to the distribution of the fatty substances mentioned sub 2. over large porous surfaces;
4. the soiling of the baking molds by residues left after the demolding, which residues build up in repeated baking cycles.

Recipes which are known from the production of wafers and do not call for the use of fats and lecithin have been adopted by way of example in Examples 19 and 20. A continuous production without such additives, specifically in conjunction with carbohydrates having low molecular weights and used in higher concentrations (Example 20) is not practicable unless the top and bottom surfaces of the products are covered as described.

TEST METHODS

1. UV Test

Principle: Irradiation of the samples with ultraviolet light (wavelength 366 nm), succeeded by a sensorial evaluation.

Equipment: CAMAG UV Cabinet: distance from sample to filter glass 80 mm, irradiation time 25 hours.

Changes of fats by oxidation are effected by radical reactions. Such reactions can be induced particularly quickly by UV irradiation. For this reason an oxidation of fats can be initiated very quickly in that fats or fat-containing samples are irradiated with UV. The odor will be changed in the UV test unless fats are absent or are present in such concentrations that they do not form decomposition products producing a rancid smell which exceeds the olfactory threshold.

For this reason the UV test is a sensitive and fast test for the presence of lipids, which owing to their kind and concentration could result in sensorially perceivable undesired changes of the shaped bodies in long-time storage under the influence of light and/or atmospheric oxygen.

Evaluation: Sensorial evaluation for changes of odor
1 No unpleasant odor
2 Very slightly rancid/burnt/musty
3 Slightly rancid/burnt/musty
4 Rancid/burnt/musty
5 Distinctly rancid/burnt/musty Analogously, the taste is evaluated for the raste features rancid/burnt/musty.

UV test passed: Score not in excess of 3.

2. Storage test

Sensorial evaluation in intervals of two weeks
Evaluation: Sensorial evaluation for changes of odor and taste
1 No unpleasant odor
2 Very slightly rancid/burnt/musty
3 Slightly rancid/burnt/musty
4 Rancid/burnt/musty
5 Distinctly rancid/burnt/musty Storage test passed:
Score after 2 weeks not in excess of 1
Score after 6 weeks not in excess of 2

3. Evaluation of shape

The term shape is applied here to the exact agreement with the shape of the shaped body which is determined by the baking mold.

In the various recipes, the removal from the mold, i.e., the release of the shaped body from the baking mold at the end of the baking operation, will be referred to in the several recipes by the term "sticking".

"Sticking" describes the fact that parts of the shaped body remain in the baking mold and the shaped body is broken or visible baked residues have been formed after some baking operations.

Any formation of cracks, such as stress cracks caused by temperature or moisture conditions, will not be criticized under the terms "sticking" or "shape".

1 All details very well shaped
2 Good shape; individual details at prominent portions not fully shaped
3 Well shaped in all important portions, individual defects
4 Distinct defects in shape
5 Poorly shaped Shape test: Scores 1 to 3: passed (+ in Table)
Scores 4 + 5: not passed

| SHUTTLING BEFORE THE MOLD IS CLOSED | | | | | | | | | |
|---|---|---|---|---|---|---|---|---|---|
| | A | B | C | D | E | F | G | H | J |
| OPEN time, sec. | 0.4 | 0.3 | 0.6 | 0.6 | 0.7 | 0.6 | 0.5 | 1 | 0.5 |
| CLOSED time, sec. | 0.6 | 0.6 | 0.3 | 0.3 | 0.6 | 0.4 | 0.5 | 0.4 | 0.5 |
| Number of cycles | 5 | 10 | 5 | 10 | 5 | 20 | 4 | 20 | 1 |
| Stroke, mm | 3 | 3 | 3 | 3 | 4 | 1 | 10 | 5 | 6 |

| CONDITIONING | | | | | |
|---|---|---|---|---|---|
| Condition: | K1 | K2 | K3 | K4 | K5 |
| Temperature, °C. | 59 | 59 | 26 | 26 | 45 |
| Relative humidity, % | 58 | 58 | 81 | 86 | 82 |
| Time, min | 30 | 60 | 70 | 210 | 30 |
| Water content, % (+/− 20 wt. %) | 7.5 | 11 | 16 | 21 | 9 |

The stated water contents (7.5% by weight, 11% by weight, etc.) are average values, which vary from specimen to specimen and will also depend on the recipe and wall thickness of the shaped body concerned.

For this reason a range of at least 20% by weight of the water content has been stated, e.g. 7.5±1.5% by weight.

But a maximum content of 22% by weight must by no means be exceeded.

Texture test

By means of a testing apparatus STRUCTOGRAPH, Brabender OHG Duisburg the baked and conditioned shaped bodies were tested.

2 kg load cell, 1000 increments correspond to a force 2 kg (19.6N)

Testing member: Cylindrical rod 6.00 mm in diameter
Reference specimen: Wall thickness 2.0 mm, ribs 8 mm×8 mm Reference specimen L (water content 8.3% by weight, Recipe No. 11):

Force required for perforating: 750 scale increments
No fracture, specimen remains intact.

Reference specimen K (water content 11.1% by weight, Recipe No. 11):

Force required for perforation: 680 scale increments
no fracture, specimen remains intact.

The texture test is a measure of the strength of the product as regards the penetration (perforation) of the shaped body by a force acting at 90 degrees to the surface of the shaped body.

Some typical measured values:

Crisp wafer: Required force 200 to 280 scale increments. The measured product is brittle and has hardly any elastic and/or plastic contents and breaks into numerous small parts under a force below 450 scale increments (corresponding to 8.8N).

Material of shaped body: 8.3% water, from Recipe No. 11 The sample is already plastic/elastic but still has slightly brittle portions, which increase the required force.

Owing to those still brittle portions of the structure the force requirement is still higher by about 10% by weight than with products which have been conditioned to a higher moisture content.

The latter products (water content 11.1% by weight) can be bent through 90° without breaking. Said property will increase as the water content increases.

For this reason the manufacture of shapes which can be buckled or folded will depend on the following:
1. The forming of thin sheetlike structures having typical wall thicknesses of 0.5 to 1.5 mm, preferably below 1 mm, optionally with folding grooves formed by the baking;
2. the maintenance of water contents in the range from 10 to 22% by weight, preferably 12 to 20% by weight; or
3. the covering of the material of the shaped body on one side or two sides with flexible coatings, which may consist, e.g., of plastics, such as polyethylene, or of plastics or natural products having rubber-elastic properties. Measurement of wafers for comparison: Force required to break below 450 scale increments, preferably below 250 scale increments

PRODUCT EXAMPLES

Example 1:
FAST FOOD PACKAGE
Container bowl having the shape of a truncated pyramid with rounded corners and edges
  Size: 130 mm×128 mm, height 40 mm Wall thickness: 1.8 mm; 2.4 mm at comolded ribs and lugs
  Baking temperature: 160° C. (outer mold); 165° C. (inner mold)
  Baking time: Minimum 80 sec.; Maximum 105 sec.
  Feeding time: 2.3 sec; closing time: 1.2 sec.
  Recipes Nos. 1 to 10; evaluation in tests as described hereinbefore Example 2:
PACKAGE INSERT
Low, tublike container bowl with thicker top edge and a plurality of tublike compartments
  Size: 186 mm×64 mm, height 17 mm
  Wall thickness: 1.8 mm; 2.0 mm at the thicker top edge
  Baking temperature: 185° C.
  Baking time: 45 sec.
  Feeding time: 1.8 sec.; closing time 1.2 sec.
  Recipes Nos. 11 to 18 and 45 to 59; evaluation in tests as described hereinbefore Example 3:
CUP
Overall height 80 mm
Diameter: bottom 55 mm; top opening 85 mm
Wall thickness 1.8 mm; thicker wall at the top 2.0 mm
Baking temperature: 170° C. (outer mold); 190° C. (inner mold)
Baking time: Minimum 43 sec. (Experiment 19); Maximum 70 sec. (Experiment 23)
Feeding time: 2.3 sec.; closing time 1.2 sec.
Recipes Nos. 19 to 27

Example 4:
ROUND PLATE
Height: 12 mm
Diameter: 150 mm
Wall thickness: 2.0 to 2.2 mm
Baking temperature: 185° C.
Baking time: 65 sec.
Feeding time: 1.9 sec.; closing time 1.2 sec.
Recipes 27 to 44; evaluation in tests as described hereinbefore Example No. 5:
Flat sheet with wafer pattern on both sides
  Size: 290 mm×460 mm
  Total thickness: 4.1 mm
  including: 0.3 mm ribbing on the underside, pitch of ribs 2 mm 1.8 mm thickness of core 2.0 mm ribbing at the top, pitch of ribs 8 mm
  Automatic feeding: feeding time 1 sec.
  Baking temperature 175° C.; baking time 100 sec.; Recipe No. 11

Example No. 6:
Shallow tray
  Size 135 mm×135 mm with rounded corners and a raised rim on all sides
  Wall thickness 2.0/2.2 mm
  Manual feeding
  Baking temperature 190° C.; baking time 90 sec.; Recipe examples Nos. 60 to 70

Example 7:
Baked shaped body for folding containers. Two parts having outside dimensions of 130 mm×125 mm×40 mm; the outer contours are congruent and mirror images with respect to the center of the hinge side between the parts (FIG. 1).
  Composition of body: From Recipe No. 109
  Composition of sheet material: Woodfree paper, white, dull, 80 g/m² stripes of 80 mm×20 mm, folded at the center in the longitudinal direction
  Sequence:
  Step 1 Insertion of the paper strip into the closed bottom baking mold
  Step 2 Feeding of the baking composition into the recesses of the bottom baking mold
  Step 3 Closing of the baking mold
  Step 4 Baking operation with production of the composite
  Step 5 Removal of the baked container
  Step 6 Conditioning at 15° C., relative humidity 76%, 145 min.

Examples 8 and 9:
Baked shaped body for folding containers. Two parts having outside dimensions of 130 mm×125 mm×40 mm; the outer contours are congruent and mirror images with respect to the center of the hinge side between the parts (FIG. 1).
  Composition of body: From Recipe No. 109
  Composition of sheet material:
  Example 2
  Nonwoven textile fabric of cotton/cellulose, 110 g/m², 80 mm×35 mm, prefolded in longitudinal direction
  Example 3
  Nonwoven fabric of glass fibers, 31.5 g/m², 80 mm×35 mm, prefolded in longitudinal direction
  Sequence as in Example 7

Example 10:
Baked shaped body for folding containers. Two parts having outside dimensions of 130 mm×125 mm×40 mm; the outer contours are congruent and mirror images with respect to the center of the hinge side between the parts (FIG. 1).
  Composition of body:
  Wheat flour: 100
  Milk powder: 1.5
  Sodium carbonate: 0.3
  Salt: 0.5
  Fat: 2
  Lecithin: 0.5
  Water: 150

Composition of sheet material: Woodfree paper, white, dull, 80 g/m² stripes of 80 mm×20 mm, folded at the center in the longitudinal direction Sequence: Step 1 Insertion of the paper strip into the closed bottom baking mold Step 2 Feeding of the baking composition into the recesses of the bottom baking mold Step 3 Closing of the baking mold Step 4 Baking operation with production of the composite Step 5 Removal of the baked container Step 6 Conditioning at 15° C., relative humidity 76%, 145 min.

Example 11:

Baked shaped body for round plate, dimensions: 150 mm in diameter; overall height 12 mm; wall thickness 2.0 mm/2.2 mm; temperature 185° C.; baking time 80 sec.

Composition of body: From Recipe No. 109

Composition of sheet material: Prefabricated shaped body material (from Recipe No. 109 with an addition of 0.05% by weight activated carbon), wall thickness 1.1 mm; smooth sheet blanked to form a flat disk 62 mm in diameter Sequence: Step 1 Feeding of the baking composition into the recesses of the bottom baking mold Step 2 Centered placing of the disk onto the fed baking composition Step 3 Closing of the baking mold Step 4 Baking operation and production of the composite Step 5 Removal from the mold Step 6 Conditioning at 15° C., relative humidity 76%, 145 minutes Result: The sheet material has fully been bonded to the resulting shaped body at its top. The entire underside of the sheet material is bonded to the shaped body; the top surface of the sheet material is exposed.

Example 13:

Baked shaped body for round plate, dimensions: 150 mm in diameter; overall height 12 mm; wall thickness 1.0 mm/2.2 mm; temperature 185° C.; baking time 80 sec.

Composition of body: From Recipe No. 109

Composition of sheet material: Woven fabric of cotton/cellulose, white with blue lines, weight 110 g/², flat disk 100 mm in diameter Sequence:

Step 1 Feeding of the baking composition into the recesses of the bottom baking mold Step 2 Centered placing of the disk onto the fed baking composition Step 3 Closing of the baking mold Step 4 Baking operation and production of the composite Step 5 Removal from the mold Step 6 Conditioning at 15° C., relative humidity 76%, 145 minutes Result: The sheet material has fully been bonded to the resulting shaped body at its top. The entire underside of the sheet material is bonded to the shaped body; the top surface of the sheet material is exposed. Example 14:

Baked shaped body for round plate, dimensions: 150 mm in diameter; overall height 12 mm; wall thickness 2.0 mm/2.2 mm; temperature 185° C.; baking time 80 sec.

Composition of body: From Recipe No. 109

Composition of sheet material: Nonwoven fabric of glass fibers, weight 31.5 g/m², flat disk 100 mm in diameter Sequence:

Step 1 Feeding of the baking composition into the recesses of the bottom baking mold Step 2 Centered placing of the disk onto the fed baking composition Step 3 Closing of the baking mold Step 4 Baking operation and production of the composite Step 5 Removal from the mold Step 6 Conditioning at 15° C., relative humidity 76%, 145 minutes Result: The sheet material has fully been bonded to the resulting shaped body at its top. The entire underside of the sheet material is bonded to the shaped body; the top surface of the sheet material is exposed.

Example 15:

Baked shaped body for round plate, dimensions: 150 mm in diameter; overall height 12 mm; wall thickness 2.0 mm/2.2 mm; temperature 185° C.; baking time 80 sec.

Composition of body: From Recipe No. 109

Composition of sheet material: Film of polyethylene terephthalate (PET); thickness of film 12 micrometers; flat disk 100 mm in diameter Sequence:

Step 1 Feeding of the baking composition into the recesses of the bottom baking mold Step 2 Centered placing of the disk onto the fed baking composition Step 3 Closing of the baking mold Step 4 Baking operation and production of the composite Step 5 Removal from the mold Result: The sheet material has fully been bonded to the resulting shaped body at its top. The entire underside of the sheet material is bonded to the shaped body; the top surface of the sheet material is exposed.

Example 16

Baked shaped body for round plate, dimensions: 150 mm in diameter; overall height 12 mm; wall thickness 2.0 mm/2.2 mm; temperature 185° C.; baking time 80 sec.

Composition of body: From Recipe No. 109

Composition of sheet material: Film of polyethylene terephthalate (PET); thickness of film 36 micrometers; flat disk 100 mm in diameter Sequence:

Step 1 Feeding of the baking composition into the recesses of the bottom baking mold Step 2 Centered placing of the disk onto the fed baking composition Step 3 Closing of the baking mold Step 4 Baking operation and production of the composite Step 5 Removal from the mold Result: The sheet material has fully been bonded to the resulting shaped body at its top. The entire underside of the sheet material is bonded to the shaped body; the top surface of the sheet material is exposed.

Example 17:

Baked shaped body for round plate, dimensions: 150 mm in diameter; overall height 12 mm; wall thickness 2.0 mm/2.2 mm; temperature 185° C.; baking time 80 sec.
- Composition of body: From same recipe as in Example 4
- Composition of sheet material: Paper, 80 g/m², woodfree, white, dull, flat disk 100 mm in diameter
- Sequence:
- Step 1 Feeding of the baking composition into the recesses of the bottom baking mold
- Step 2 Centered placing of the disk onto the fed baking composition
- Step 3 Closing of the baking mold
- Step 4 Baking operation and production of the composite
- Step 5 Removal from the mold
- Step 6 Conditioning at 15° C., relative humidity 76%, 145 minutes
- Result: The sheet material has fully been bonded to the resulting shaped body at its top. The entire underside of the sheet material is bonded to the shaped body; the top surface of the sheet material is exposed.

Example 18:

Baked shaped body for round plate, dimensions: 150 mm in diameter; overall height 12 mm; wall thickness 2.0 mm/2.2 mm; temperature 185° C.; baking time 80 sec.
- Composition of body: From Recipe No. 109
- Composition of sheet material: Nonwoven fabric of glass fibers, weight 31.5 g/m²: square fabric 200 mm×200 mm Sequence:
- Step 1 Feeding of the baking composition into the recess of the bottom baking mold
- Step 2 Insertion of the square piece of sheet material to completely and symmetrically cover the bottom baking mold
- Step 3 Closing of the baking mold
- Step 4 Baking operation and production of the composite
- Step 5 Removal from the mold
- Step 6 Conditioning at 15° C.; relative humidity 76%; 145 minutes
- Result: The sheet material covers the entire top surface (inside surface) of the shaped body consisting of the composite.

Example 19

Baked shaped body for round plate, dimensions: 150 mm in diameter; overall height 12 mm; wall thickness 2.0 mm/2.2 mm; temperature 185° C.; baking time 80 sec.
- Composition of body: From Recipe No. 109
- Composition of the sheet material: Special paper for foodstuffs ("baker's paper), weight 70 g/m², size 190 mm×200 mm
- Sequence:
- Step 1 Feeding of the baking composition into the recess of the bottom baking mold
- Step 2 Insertion of the square piece of sheet material to completely and symmetrically cover the bottom baking mold
- Step 3 Closing of the baking mold
- Step 4 Baking operation and production of the composite
- Step 5 Removal from the mold
- Step 6 Conditioning at 15° C.; relative humidity 76%; 145 minutes
- Result: The sheet material covers the entire top surface (inside surface) of the shaped body consisting of the composite.

Example 20:

Baked shaped body for round plate, dimensions: 150 mm in diameter; overall height 12 mm; wall thickness 2.0 mm/2.2 mm; temperature 185° C.; baking time 80 sec.
- Composition of body: From Recipe No. 109
- Composition of sheet material: PET film; thickness of film 15 micrometers; size 175 mm×210 mm
- Sequence:
- Step 1 Feeding of the baking composition into the recess of the bottom baking mold
- Step 2 Insertion of the square piece of sheet material to completely and symmetrically cover the bottom baking mold
- Step 3 Closing of the baking mold
- Step 4 Baking operation and production of the composite
- Step 5 Removal from the mold
- Result: The sheet material covers the entire top surface (inside surface) of the shaped body consisting of the composite.

Example 21:

Baked shaped body for round plate, dimensions: 150 mm in diameter; overall height 12 mm; wall thickness 2.0 mm/2.2 mm; temperature 185° C.; baking time 80 sec.
- Composition of body: From Recipe No. 109
- Composition of sheet material: PET film; thickness of film 36 micrometers; size 175 mm×210 mm
- Sequence:
- Step 1 Feeding of the baking composition into the recess of the bottom baking mold
- Step 2 Insertion of the square piece of sheet material to completely and symmetrically cover the bottom baking mold
- Step 3 Closing of the baking mold
- Step 4 Baking operation and production of the composite
- Step 5 Removal from the mold
- Result: The sheet material covers the entire top surface (inside surface) of the shaped body consisting of the composite.

Example 22:

Baked shaped body for round plate, dimensions: 150 mm in diameter; overall height 12 mm; wall thickness 2.0 mm/2.2 mm; temperature 185° C.; baking time 80 sec.
- Composition of body: From Recipe No. 109
- Composition of sheet material: PET films; thickness of film 15 micrometers; size 175 mm×200 mm, 2 sheets
- Sequence:
- Step 1 Insertion of the first film to cover the bottom mold
- Step 2 Feeding of the baking composition
- Step 3 Insertion of the second sheet to entirely and symmetrically cover the bottom baking mold
- Step 4 Closing of the baking mold
- Step 5 Baking operation and production of the composite
- Step 6 Removal from the mold
- Result: The sheet material covers the entire top surface (inside surface) and bottom surface (outside surface) of the shaped body consisting of the composite.

Example 23:

Baked shaped body for round plate, dimensions: 150 mm in diameter; overall height 12 mm; wall thickness 2.0 mm/2.2 mm; temperature 185° C.; baking time 80 sec.

Composition of body: From Recipe No. 109
Composition of sheet material: Prefabricated shaped body material (from Recipe No. 109 with an addition of 0.05% by weight activated carbon), wall thickness 1.1 mm; smooth sheet blanked to form a flat disk 62 mm in diameter Sequence:
Step 1 Feeding of the baking composition into the recesses of the bottom baking mold
Step 2 Centered placing of the disk onto the fed baking composition
Step 3 Closing of the baking mold
Step 4 Baking operation and production of the composite
Step 5 Removal from the mold Composition for body (in parts by weight):
Wheat flour: 100
Starch: 8
Sugar: 1
Egg powder: 2
Sodium carbonate: 0.3
Salt: 0.5
Water: 150
Fat: -
Lecithin: -

Composition of sheet material: PET films; thickness of film 15 micrometers; size 175 mm×200 mm, 2 sheets Sequence:
Step 1 Insertion of the first film to cover the bottom mold
Step 2 Feeding of the baking composition
Step 3 Insertion of the second sheet to entirely and symmetrically cover the bottom baking mold
Step 4 Closing of the baking mold
Step 5 Baking operation and production of the composite
Step 6 Removal from the mold Result: The sheet material covers the entire top surface (inside surface) and bottom surface (outside surface) of the shaped body consisting of the composite.

Example 24:
Baked shaped body for round plate, dimensions: 150 mm in diameter; overall height 12 mm; wall thickness 2.0 mm/2.2 mm; temperature 185° C.; baking time 80 sec.

Composition of body: From Recipe No. 109
Composition of sheet material: Prefabricated shaped body material (from Recipe No. 109 with an addition of 0.05% by weight activated carbon), wall thickness 1.1 mm; smooth sheet blanked to form a flat disk 62 mm in diameter Sequence:
Step 1 Feeding of the baking composition into the recesses of the bottom baking mold
Step 2 Centered placing of the disk onto the fed baking composition
Step 3 Closing of the baking mold
Step 4 Baking operation and production of the composite
Step 5 Removal from the mold Composition for body (in parts by weight):
Wheat flour: 100
Sugar: 42
Milk powder: 2
Sodium carbonate: 0.3
Salt: 0.6
Water: 125
Fat: -
Lecithin: -

Composition of sheet material: PET films; thickness of film 15 micrometers; size 175 mm×200 mm, 2 sheets Sequence:
Step 1 Insertion of the first film to cover the bottom mold
Step 2 Feeding of the baking composition
Step 3 Insertion of the second sheet to entirely and symmetrically cover the bottom baking mold
Step 4 Closing of the baking mold
Step 5 Baking operation and production of the composite
Step 6 Removal from the mold Result: The sheet material covers the entire top surface (inside surface) and bottom surface (outside surface) of the shaped body consisting of the composite.

Example 25: Flat Sheet
Size 290 mm×230 mm; wall thickness 1.4 mm; smooth surface;
Baking temperature 180° C.; baking time 105 sec.
Recipe No. 116
Result: Perfectly shaped smooth sheets with closed surfaces, which can well be written and printed upon Example 26: Shallow tray
Size 135 mm×185 mm with rounded corners and a raised rim on all sides
Wall thickness 2.0 mm/2.2 mm
Baking temperature 180° C.; baking time 130 sec.
Recipes Nos. 117 and 119 to 127

Example 27: Rectangular container, tapered with a rim for stacking
Outside dimensions 142 mm×91 mm (at the top) 112 mm×62 mm (at the bottom)
Height: 42 mm
Wall thickness 1.8 mm/2.0 mm, rib pattern 5 mm×5 mm, 45 degrees, on outside and inside surfaces of bottom
Baking temperature 165° C./180° C.; baking time 40 sec.
Recipes Nos. 116, 128

Example 28: Tublike container bowl with thicker top rim and 8 tublike compartments
Size 106 mm×173 mm, height 30 mm
Wall thickness 1.8 mm/2.0 mm; rib pattern 5 mm×5 mm, 45°, on inside surface of bottom
Baking temperature 175° C./190° C.
Baking time: 50 sec.
Recipes Nos. 116, 128

Example 29:
Low round cup
Diameter 75 mm (at top rim) 50 mm (at bottom)
Height 30 mm
having round-rodlike ornamental moldings on the outside, a smooth inner edge and a thicker rim (maximum thickness 4 mm)
Wall thickness 1.5 mm/1.8 mm, in the region provided with ornament between 1.2 mm and 3.2 mm
Baking temperature 180° C./185° C.
Baking time: 60 sec.

Recipes Nos. 116, 118

Example 30: Tublike container bowl with a thicker top rim and with a ribbed bottom and provided with a fit-in cover Outside dimensions:
135 mm × 171 mm at the most at the top
115 mm × 150 mm at the most at the bottom
Height 90 mm
Cover: up to 127 mm × 164 mm, height 18 mm
Wall thickness 1.8 mm
Baking temperature: 190° C.
Baking time: 60 sec.
Recipe No. 116

|  | No. 1 | No. 2 | No. 3 | No. 4 | No. 5 |
|---|---|---|---|---|---|
| Potato starch | 100 | 100 | 100 | 100 | 100 |
| Wheat flour | — | — | — | — | — |
| Water | 125 | 125 | 125 | 167 | 167 |
| Thickening agent | 0.5(1) | 0.5(1) | 0.5(1) | — | 0.5(1) |
| High-cellulose material | 10(4) | 10(4) | 10(4) | 20(4) | 25(4) |
| Fat | — | 5(9) | — | 5.7(9) | — |
| Release agent | — | — | 1(5) | — | 2.5(6) |
| Other components | — | — | — | — | — |
| Shuttling, condition | A | B, C, no | D | C, no | C |
| Shape (a) | + | +, +, — | + | +, — | + |
| Sticking | yes | no | no | yes | no |
| Conditioning | K3 | K3 | K3 | K3 | K4 |
| UV test (a) | + | — | + | — | + |
| Storage test (a) | + | — | + | — | + |

|  | No. 6 | No. 7 | No. 8 | No. 9 | No. 10 |
|---|---|---|---|---|---|
| Potato starch | 100 | 100 | 100 | 50 | 100 |
| Corn starch | — | — | — | 50 | — |
| Water | 150 | 120 | 100 | 110 | 110 |
| Thickening agent | 1(10) | 1(1) | 0.5(11) | 0.5(2) | 0.3(11) |
| High-cellulose material | 10(4) | — | — | — | — |
| Fat | 10(12) | — | — | — | — |
| Release agent | 10(7) | 10(8) | 1(5) | 1(5) | 1(5) |
| Other components | — | — | — | — | — |
| Shuttling, condition | C | E | G | G | C |
| Shape (a) | + | + | + | + | + |
| Sticking | no | no | no | no | no |
| Conditioning | K3 | K3 | K3 | K4 | K4 |
| UV test (a) | — | + | + | + | + |
| Storage test (a) | — | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Sodium alginate
(11) Carragheen
(12) Hard fat

|  | No. 11 | No. 12 | No. 13 | No. 14 | No. 15 |
|---|---|---|---|---|---|
| Potato starch | 100 | 100 | 100 | 100 | 100 |
| Water | 130 | 150 | 220 | 130 | 130 |
| Thickening agent | 5(3) | 0.5(2) | 0.5(2) | 0.6(2) | 5(3) |
| High-cellulose material | 10(4) | 10(4) | 10(4) | 10(4) | 10(4) |
| Fat | — | — | — | — | — |
| Release agent | 1(7) | 15(7) | 40(7) | 10(10) | 1.5(11) |
| Other components | — | — | — | — | — |
| Shuttling, condition | C | D | D | C | C |
| Shape (a) | + | + | + | + | + |
| Sticking | no | no | no | yes | no |
| Conditioning | K5 | K5 | K5 | K5 | n.p. |
| UV test (a) | + | + | + | + | n.p. |
| Storage test (a) | + | + | + | + | n.p. |

(a) + means: test passed
(1) Carboxymethylcellulose
(2) Guar
(3) Modified starch
(4) Cellulose fibers
(5) Aluminum stearate
(6) Calcium stearate -continued (7) Magnesium stearate
(8) Zinc stearate
(9) Coconut oil
(10) Paraffin wax
(11) Magnesia
n.p. not performed

|  | No. 16 | No. 17 | No. 18 | No. 19 | No. 20 |
|---|---|---|---|---|---|
| Potato starch | 100 | 100 | 100 | 100 | 100 |
| Water | 130 | 130 | 130 | 130 | 130 |
| Thickening agent | 0.5(1) | 0.5(1) | 0.5(1) | 0.5(1) | 0.5(1) |
| High-cellulose material | 10(4) | 10(4) | 10(4) | 10(4) | 10(4) |
| Release agent | 2(6) | 2(6) | 2(6) | 2(10) | 2(11) |
| Other components | 5(12) | 4(13) | 5(14) | — | — |
| Shuttling, condition | B | B | B | E | E |
| Shape (a) | + | + | + | + | + |
| Sticking | no | no | no | yes | no |
| Conditioning | K1 | K1 | K1 | K2 | K2 |
| UV test (a) | + | + | + | n.p. | + |
| Storage test (a) | + | + | + | n.p. | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Paraffin wax
(11) Stearic acid
(12) Common salt
(13) Glycerinne
(14) Sorbitol
n.p. not performed

|  | No. 21 | No. 22 | No. 23 | No. 24 | No. 25 |
|---|---|---|---|---|---|
| Potato starch | 100 | 100 | 100 | 100 | 100 |
| Water | 130 | 130 | 130 | 130 | 130 |
| Thickening agent | 0.5(1) | 0.5(1) | 0.5(1) | 0.5(1) | 0.5(1) |
| High-cellulose material | 10(4) | 10(4) | 10(4) | 10(4) | 10(4) |
| Fat | — | — | — | — | 2(9) |
| Release agent | 2(10) | 2(11) | 2(8) | 2(12) | — |
| Other components | — | — | — | — | — |
| Shuttling, condition | E | E | E | E | E |
| Shape (a) | + | + | + | + | + |
| Sticking | no | no | no | no | no |
| Conditioning | K2 | K2 | K2 | K2 | K2 |
| UV test (a) | + | +(b) | + | — | — |
| Storage test (a) | + | +(b) | + | — | — |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Hydroxystearic acid
(11) Sodium stearate
(12) Lecithin
(b) Soapy taste

|  | No. 26 | No. 27 | No. 28 | No. 29 | No. 30 |
|---|---|---|---|---|---|
| Potato starch | 95 | 100 | 100 | 100 | 100 |
| Water | 140 | 150 | 145 | 165 | 150 |
| Thickening agent | 5(3) | 0.5(2) | 0.5(2) | 0.5(2) | 0.5(1) |
| High-cellulose material | 10(4) | 30(10) | 29(11) | 50(12) | 10(13) |
| Fat | 10(9) | — | — | — | — |
| Release agent | 1(14) | 3.5(5) | 3(6) | 2(7) | 1.5(8) |
| Other components | — | — | — | — | — |
| Shuttling, condition | G | G | G | G | G |

-continued

| | | | | | |
|---|---|---|---|---|---|
| Shape (a) | (+) | + | + | + | + |
| Sticking | no | no | no | no | no |
| Conditioning | K1 | K1 | K1 | K1 | K1 |
| UV test (a) | — | + | + | +(b) | + |
| Storage test (a) | — | + | + | +(b) | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Wheat bran, fine, defatted
(11) Ground straw, short-fibred
(12) Ground wood
(13) Cellulose, fiber length 1500 micrometers
(14) Lecithin
(b) Smack

| | No. 31 | No. 32 | No. 33 | No. 34 | No. 35 |
|---|---|---|---|---|---|
| Potato starch | 65 | 85 | 85 | — | 75 |
| Wheat flour | 35 | 15 | 15 | 100 | 25 |
| Water | 145 | 140 | 140 | 160 | 145 |
| Thickening agent | 0.3(2) | 0.4(2) | 0.4(2) | — | 5(3) |
| High-cellulose material | 10(4) | 10(4) | 10(4) | 10(4) | 10(4) |
| Release agent | 1(5) | 1(5) | 1(5) | 5(7) | 1.5(7) |
| Other components | — | — | 0.05(10) | 0.05(11) | — |
| Shuttling, condition | A | A | A | A | A |
| Shape (a) | + | + | + | + | + |
| Sticking | no | no | no | no | no |
| Conditioning | K1 | K1 | K1 | K1 | K1 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Sodium methyl-4-hydroxybenzoate
(11) Dodecyl gallate

| | No. 36 | No. 37 | No. 38 | No. 39 | No. 40 |
|---|---|---|---|---|---|
| Potato starch | 50 | 50 | — | 50 | 40 |
| Wheat flour | 50 | 50 | 100 | 50 | 60 |
| Water | 130 | 130 | 160 | 130 | 140 |
| Thickening agent | 0.4(1) | 0.4(1) | — | 0.4(1) | 0.4(10) |
| High-cellulose material | 10(4) | 10(4) | 10(4) | 10(4) | 10(4) |
| Fat | — | 2(9) | — | 10(11) | — |
| Release agent | 2.5(7) | — | 5(7) | — | 3(7) |
| Shuttling, condition | A | A | A | A | A |
| Shape (a) | + | + | + | + | + |
| Sticking | no | yes | no | no | no |
| Conditioning | K5 | n.p. | K5 | K5 | K5 |
| UV test (a) | + | n.p. | — | — | + |
| Storage test (a) | + | n.p. | + | — | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Carrageen
(11) Soybean oil, hardened
n.p. not performed -continued

|  | No. 41 | No. 42 | No. 43 | No. 44 | No. 45 |
|---|---|---|---|---|---|
| Potato starch | 47 | 50 | 40 | 50 | 90 |
| Other starch | 53(10) | 50(11) | 60(12) | 50(13) | — |
| Water | 130 | 130 | 130 | 130 | 145 |
| Thickening agent | 0.5(1) | 0.5(1) | 0.5(1) | 0.5(1) | 10(14) |
| High-cellulose material | 5(4) | 5(4) | 5(4) | 5(4) | 10(4) |
| Release agent | 2(5) | 2(5) | 2(5) | 2(5) | 2(6) |
| Other components | — | — | — | — | — |
| Shuttling, condition | G | G | G | G | G |
| Shape (a) | + | + | + | + | + |
| Sticking | no | no | no | no | no |
| Conditioning | K3 | K3 | K3 | K3 | K1 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Pea starch
(11) Rice starch
(12) Corn starch
(13) Tapioca
(14) Potato starch, gelatinized

|  | No. 46 | No. 47 | No. 48 | No. 49 | No. 50 |
|---|---|---|---|---|---|
| Potato starch | 80 | 90 | 90 | 95 | 100 |
| Water | 170 | 110 | 110 | 165 | 90 |
| Thickening agent | 20(10) | 11.5(10) | 10(10) | 5(10) | 4.5(11) |
| High-cellulose material | — | — | — | 10 | — |
| Release agent | 2(5) | 2(5) | 2(5) | 1(7) | 2(5) |
| Other components | — | — | — | — | — |
| Shuttling, condition | A | A | A | A | A |
| Shape (a) | + | + | + | + | + |
| Sticking | no | no | no | no | no |
| Conditioning | K1 | K1 | K1 | K1 | K1 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Corn starch, gelatinized
(11) Gum arabic
(12) Gelatine

|  | No. 51 | No. 52 | No. 53 | No. 54 | No. 55 |
|---|---|---|---|---|---|
| Potato starch | 90 | 100 | 65 | 65 | 65 |
| Corn starch | — | — | 35 | 35 | 35 |
| Water | 110 | 135 | 135 | 135 | 135 |
| Thickening agent | 10(3) | 2.5(3) 0.3(2) | 0.5(1) | 0.5(1) | 0.5(1) |
| High-cellulose material | — | 5(4) | 5(4) | 5(4) | 5(4) |
| Release agent | 2(8) | 2(8) | 2(7) | 2(7) | 2(7) |
| Other components | — | — | 0.2(10) | 0.02(11) | 2(12) |
| Shuttling, condition | A | A | A | A | A |
| Shape (a) | + | + | + | + | + |
| Sticking | no | no | no | no | no |
| Conditioning | K1 | K1 | K1 | K1 | K1 |
| UV test (a) | + | + | + | + | + |
| Storage test (a) | + | + | + | + | + |

(a) + means: test passed
(1) Carboxymethylcellulose

-continued (2) Guar
(3) Modified starch
(4) Cellulose fibers
(5) Aluminum stearate
(6) Calcium stearate
(7) Magnesium stearate
(8) Zinc stearate
(9) Coconut oil
(10) Tartrazine
(11) Chlorophyll, water-soluble
(12) Sugar color

|  | No. 56 | No. 57 | No. 58 | No. 59 | No. 60 |
|---|---|---|---|---|---|
| Potato starch | 100 | 100 | 100 | 100 | 100 |
| Water | 135 | 140 | 140 | 160 | 90 |
| Thickening agent | 0.5(1) | 5(3) | 5(3) | 5(3) | — |
| High-cellulose material | 10(4) | 10(4) | 10(4) | 10(4) | 10(4) |
| Release agent | 2(5) | 2(6) | 2(8) | 2(7) | 2(5) |
| Other components | 2(11) | 2.5(12) | 5(13) | 25(14) | — |
| Shuttling, condition | E | E | E | E | I |
| Shape (a) | + | + | + | + | + |
| Sticking | no | no | no | no | no |
| Conditioning | K1 | K1 | K1 | K3 | K3 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Sugar color
(11) Cocoa powder 10/12
(12) Color pigment
(13) White pigment
(14) Silica gel

|  | No. 61 | No. 62 | No. 63 | No. 64 | No. 65 |
|---|---|---|---|---|---|
| Potato starch | 100 | 100 | 50 | — | 100 |
| Water | 70 | 135 | 115 | 100 | 130 |
| Thickening agent | — | 0.5(2) | — | — | 4(12) |
| High-cellulose material | — | 10(4) | — | — | 10(4) |
| Release agent | 2(6) | 2(10) | 2(8) | 2(7) | 2(5) |
| Other components | — | — | 50(11) | 100(11) | — |
| Shuttling, condition | I | E | I | I | E |
| Shape (a) | + | + | + | + | + |
| Sticking | no | no | no | no | no |
| Conditioning | K1 | K1 | K1 | K1 | K1 |
| UV test (a) | + | + | + | — | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Stearic acid amide
(11) Rye flour
(12) Bakery waste*
*Dried and ground waste baked product from preceding experiment (No. 62)

|  | No. 66 | No. 67 | No. 68 | No. 69 | No. 70 |
|---|---|---|---|---|---|
| Potato starch | 100 | 100 | 100 | 100 | 100 |
| Water | 130 | 130 | 130 | 130 | 130 |
| Thickening agent | 0.5(2) | 0.5(2) | 0.5(2) | 0.5(2) | 0.5(2) |
| High-cellulose material | 10(4) | 10(4) | 10(4) | 10(4) | 10(4) |
| Release agent | 2(10) | 2(11) | 2(12) | 2(13) | 4(13) |

-continued

| | | | | | |
|---|---|---|---|---|---|
| Other components | — | — | — | — | — |
| Shuttling, condition | I | I | I | I | I |
| Shape (a) | + | + | + | + | + |
| Sticking | no | no | no | no | no |
| Conditioning | K1 | K1 | K1 | K1 | K1 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Fatty acids having chains of medium length*
(11) Al salt of fatty acids having chains of medium length
(12) Mg salt of fatty acids having chains of medium length
(13) Ca salt of fatty acids having chains of medium length
*>70% C10, C12, C14; minor contents smaller than C10 and larger than C14

| | No. 71 | No. 72 | No. 73 | No. 74 | No. 75 |
|---|---|---|---|---|---|
| Potato starch | 100 | 100 | 25 | 100 | 100 |
| Water | 130 | 130 | 115 | 130 | 130 |
| Thickening agent | 5(3) | 4(10) | 0.5(2) | 0.5(2) | 0.5(2) |
| High-cellulose material | 10(4) | 10(4) | 5(4) | 10(4) | 10(4) |
| Release agent | 1(7) | 2(5) | 2(7) | 2(6) | 2(8) |
| Other components | — | — | 75(11) | — | — |
| Shuttling, condition | no | no | no | no | no |
| Shape (a) | + | + | + | + | + |
| Sticking | no | no | no | no | no |
| Conditioning | K1 | K1 | K1 | K1 | K1 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Bakery waste*
(11) Rice starch
*Dried and ground waste baked products from preceding experiment (No. 65)

| | No. 76 | No. 77 | No. 78 | No. 79 | No. 80 |
|---|---|---|---|---|---|
| Potato starch | 100 | 100 | 100 | 100 | 100 |
| Water | 100 | 100 | 130 | 100 | 100 |
| Thickening agent | 0.5(2) | — | 0.5(2) | 0.5(2) | 0.5(2) |
| High-cellulose material | 10(4) | 10(4) | 10(4) | — | 10(4) |
| Release agent | 2(7) | 2(7) | 2(7) | 2(7) | 2(7) |
| Other components | 0.1(10) | 0.5(10) | 0.2(10) | 0.1(10) | 0.05(10) |
| Shuttling, condition | I | I | I | I | I |
| Shape (a) | + | + | + | + | + |
| Sticking | no | no | no | no | no |
| Conditioning | K5 | K5 | K5 | K5 | K5 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Zirconium carbonate solution (Bacote 20, Magnesium Elektron)
(11) Calcium carbonate, powdered

| | No. | No. | No. | No. | No. |
|---|---|---|---|---|---|

-continued

|  | 81 | 82 | 83 | 84 | 85 |
|---|---|---|---|---|---|
| Potato starch | 100 | 100 | 100 | 100 | 100 |
| Water | 90 | 90 | 100 | 50 | 80 |
| Thickening agent | — | — | — | — | — |
| High-cellulose material | 5(4) | — | 5(4) | — | 5(4) |
| Release agent | 2(6) | 2(6) | 2(6) | 2(7) | 2(7) |
| Other components | 5(10) | 10(10) | 20(10) | — | — |
| Shuttling, condition | I | I | I | I | I |
| Shape (a) | + | + | + | + | + |
| Sticking | no | no | no | no | no |
| Conditioning | K5 | K5 | K5 | K3 | K3 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Calcium carbonate, powdered

|  | No. 86 | No. 87 | No. 88 | No. 89 |
|---|---|---|---|---|
| Wheat flour | 100 | 100 | — | — |
| Potato starch | — | — | 100 | 100 |
| Thickening agent | — | 1(2) | 0.3(2) | — |
| High-cellulose material | — | 10(4) | 10(4) | 10(4) |
| Release agent | 2(8) | 2(7) | 2(7) | 2(7) |
| Other components | — | — | 25(10) | 2.5(10) |
| Shuttling, condition | I | I | I | I |
| Shape (a) | + | + | + | + |
| Sticking | no | no | no | no |
| Conditioning | K3 | K3 | K3 | K3 |
| UV test (a) | — | — | + | + |
| Storage test (a) | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Talc
(11) Calcium carbonate, powdered

|  | No. 90 | No. 91 | No. 92 |
|---|---|---|---|
| Corn starch | 100 | 100 | 100 |
| Water | 130 | 130 | 130 |
| Thickening agent | 0.7(2) | 0.7(2) | 0.7(2) |
| High-cellulose material | 10(4) | 10(4) | 10(4) |
| Release agent | 2(5) | 2(5) | 2(5) |
| Other components | — | 10(11) | 20(10) |
| Shuttling, condition | A | A | A |
| Shape (a) | + | + | + |
| Sticking | no | no | no |
| Conditioning | K3 | K3 | K3 |
| UV test (a) | + | + | + |
| Storage test (a) | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Talc
(11) Calcium carbonate, powdered -continued

|  | No. 93 | No. 94 | No. 95 | No. 96 |
|---|---|---|---|---|
| Potato starch | 100 | 100 | 100 | 100 |
| Water | 140 | 140 | 100 | 150 |
| Thickening agent | 0.5(2) | 0.5(2) | 0.5(2) | 0.5(2) |
| High-cellulose material | 10(4) | 10(4) | — | 10(4) |
| Filler | 2.5(11) | 2.5(11) | — | — |
| Release agent | 2(7) | 2(7) | 2(7) | 2(7) |
| Other components | 0.2(10) | 0.4(10) | 0.2(10) | 0.3(10) |
|  | 0.01(12) |  |  |  |
| Shuttling, condition | A | A | A | A |
| Shape (a) | + | + | + | + |
| Sticking | no | no | no | no |
| Conditioning | K3 | K3 | K3 | K3 |
| UV test (a) | + | + | + | + |
| Storage test (a) | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Bacote 20
(11) Calcium carbonate, powdered
(12) Chlorophyll (dyestuff)

|  | No. 97 | No. 98 | No. 99 | No. 100 | No. 101 |
|---|---|---|---|---|---|
| Potato starch | 100 | 100 | 100 | 100 | 100 |
| Water | 120 | 120 | 120 | 120 | 120 |
| Thickening agent | 0.5(2) | 0.5(2) | 0.5(2) | 0.5(2) | 0.5(2) |
| High-cellulose material | 10(4) | 10(4) | 10(4) | 10(4) | 10(4) |
| Release agent | 2(7) | 2(7) | 2(7) | 2(7) | 2(7) |
| Other components | 2(10) | 2(11) | 2(12) | 2(13) | 2(14) |
| Shuttling, condition | I | I | I | I | I |
| Shape (a) | + | + | + | + | + |
| Sticking | no | no | no | no | no |
| Conditioning | K3 | K3 | K3 | K3 | K3 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Sodium caseinate
(11) Soybean isolate
(12) Wheat gluten
(13) Egg white powder
(14) Casein

|  | No. 102 | No. 103 | No. 104 | No. 105 | No. 106 |
|---|---|---|---|---|---|
| Wheat flour | — | — | — | 100 | — |
| Potato starch | 100 | 100 | 100 | — | 100 |
| Water | 130 | 140 | 150 | 130 | 150 |
| Thickening agent | 0.5(2) | 0.5(1) | 0.5(1) | 1(2) | 0.5(2) |
| High-cellulose material | 5(4) | 10(4) | 5(4) | 10(4) | — |
| Release agent | 1(7) | 2(7) | 2(7) | 2(7) | 2(7) |
| Other components | 6(9) | 25(10) | 10(10) | 10(10) | 30(11) |
| Shuttling, condition | A | A | A | A | A |
| Shape (a) | + | + | + | + | + |
| Sticking | no | no | no | no | no |
| Conditioning | K3 | K3 | K3 | K3 | K3 |
| UV test (a) | + | + | + | + | + |
| Storage test (a) | + | + | + | + | + |

(a) + means: test passed
(1) Carboxymethylcellulose
(2) Guar

-continued (3) Modified starch
(4) Cellulose fibers
(5) Aluminum stearate
(6) Calcium stearate
(7) Magnesium stearate
(8) Zinc stearate
(9) Shellac, powdered
(10) Activated carbon, powdered
(11) Cellulose, acetylated

|  | No. 107 | No. 108 |
|---|---|---|
| Potato starch | 100 | 100 |
| Water | 130 | 130 |
| Thickening agent | 0.5(2) | 0.3(2) |
| High-cellulose material | 10(4) | 10(4) |
| Release agent | 2(7) | 2(5) |
| Other components | 10(11) | 25(10) |
| Shuttling, condition | A | I |
| Shape (a) | + | + |
| Sticking | no | no |
| Conditioning | K3 | K3 |
| UV test (a) | + | + |
| Storage test (a) | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Coconut oil
(10) Alumina
(11) Cellulose, acetylated

|  | No. 109 | No. 110 | No. 111 | No. 112 | No. 113 |
|---|---|---|---|---|---|
| Potato starch | 100 | 100 | 100 | 100 | 100 |
| Water | 120 | 120 | 120 | 120 | 120 |
| Thickening agent | 0.5(2) | 0.5(2) | 0.5(2) | 0.5(2) | 0.5(2) |
| High-cellulose material | 10(4) | 10(4) | 10(4) | 10(4) | 10(4) |
| Release agent | 2(7) | 1(7) | — | — | — |
| Other components | — | 0.5(9) | 1(9) | 5(9) | 10(9) |
| Shuttling, condition | I | I | I | I | I |
| Shape (a) | + | + | + | + | + |
| Sticking | no | no | no | no | no |
| Conditioning | K3 | K3 | K3 | K3 | K3 |
| UV test (a) | + | + | + | + | + |
| Storage test (a) | + | + | + | + | + |

(a) + means: test passed
(1) Carboxymethylcellulose
(2) Guar
(3) Modified starch
(4) Cellulose fibers
(5) Aluminum stearate
(6) Calcium stearate
(7) Magnesium stearate
(8) Zinc stearate
(9) Polymethylhydrogensiloxane, Dow Corning 1107 fluid

|  | No. 114 | No. 115 |
|---|---|---|
| Potato starch | 100 | 100 |
| Water | 120 | 120 |
| Thickening agent | 0.5(2) | 0.5(2) |
| High-cellulose material | 10(4) | 10(4) |
| Release agent | — | 2(7) |
| Other components | 15(9) | 2(10) |
| Shuttling, condition | I | I |
| Shape (a) | + | + |
| Sticking | no | no |
| Conditioning | K3 | K3 |
| UV test (a) | + | + |
| Storage test (a) | + | + |

(a) + means: test passed
(1) Carboxymethylcellulose
(2) Guar
(3) Modified starch -continued (4) Cellulose fibers
(5) Aluminum stearate
(6) Calcium stearate
(7) Magnesium stearate
(8) Zinc stearate
(9) Polymethylhydrogensiloxane, Dow Corning 1107 fluid
(10) Polymethylhydrogensiloxane emulsion, Wacker-BS 46

|  | No. 116 | No. 117 | No. 118 | No. 119 | No. 120 |
|---|---|---|---|---|---|
| Starch | 100(1) | 100(1) | 100(1) | 100(2) | 100(2) |
| Water | 120 | 115 | 160 | 100 | 130 |
| Thickening agent | 0.8(4) | 0.7(4) | 0.7(4) | 0.5(4) | 0.5(4) |
| High-cellulose material | 5(5) | — | — | 10(5) | 10(5) |
| Release agent | 2(11) | 2(11) | 2(11) | 2(10) | 2(10) |
| Other components | — | 10(6) | 25(6) | — | — |
| Shuttling, condition | — | I | I | — | I |
| Shape (a) | + | + | + | + | + |
| Sticking | no | no | no | no | no |
| Conditioning | (b) | (b) | (b) | (b) | (b) |
| UV test (a) | + | + | + | + | + |
| Storage test (a) | + | + | + | + | + |

(a) + means: test passed
(b) 15° C., rel. hum. 78%, 180 min.
(1) Potato starch
(2) Tapioca
(3) Corn amylo starch
(4) Guar
(5) Cellulose fibers
(6) Polyhydroxybutyric acid, reference sample as flakes
(7) Potato pulp, fresh
(8) Beetroot chips, dried and ground
(9) Flax fibers, fibrous layer less than 5 mm
(10) Calcium stearate
(11) Magnesium stearate

|  | No. 121 | No. 122 | No. 123 | No. 124 | No. 125 |
|---|---|---|---|---|---|
| Starch | 100(1) | 100(1) | 100(1) | 100(1) | 100(1) |
| Water | 67.5 | 75 | 87.5 | 127 | 130 |
| Thickening agent | 0.5(4) | 0.5(4) | 0.5(4) | 0.5(4) | 0.5(4) |
| High-cellulose material | — | — | — | — | — |
| Release agent | 2(11) | 2(11) | 2(11) | 2(11) | 2(11) |
| Other components | 62.5(7) | 33(7) | 62.5(7) | 33(7) | 10(9) |
| Shuttling, condition | I | I | I | I | — |
| Shape (a) | + | + | + | + | + |
| Sticking | no | no | no | no | no |
| Conditioning | (b) | (b) | (b) | (b) | (b) |
| UV test (a) | + | + | + | + | + |
| Storage test (a) | + | + | + | + | + |

(a) + means: test passed
(b) 15° C., rel. hum. 78%, 180 min.
(1) Potato starch
(2) Tapioca
(3) Corn amylo starch
(4) Guar
(5) Cellulose fibers
(6) Polyhydroxybutyric acid, reference sample as flakes
(7) Potato pulp, fresh
(8) Beetroot chips, dried and ground
(9) Flax fibers, fibrous layer less than 5 mm
(10) Calcium stearate
(11) Magnesium stearate

|  | No. 126 | No. 127 | No. 128 |
|---|---|---|---|
| Starch | 100(1) | 100(1) | 90(2) |
| Water | 130 | 130 | 100 |
| Thickening agent | 0.5(4) | 0.5(4) | 0.3(4) |
| High-cellulose material | — | — | — |
| Release agent | 2(10) | 2(10) | 2(11) |
| Other components | 10(8) | 20(8) | 10(3) |
| Shuttling, condition | I | I | I |
| Shape (a) | + | + | + |
| Sticking | no | no | no |
| Conditioning | (b) | (b) | (b) |
| UV test (a) | + | + | + |
| Storage test (a) | + | + | + |

(a) + means: test passed

-continued (b) 15° C., rel. hum. 78%, 180 min.
(1) Potato starch
(2) Tapioca
(3) Corn amylo starch
(4) Guar
(5) Cellulose fibers
(6) Polyhydroxybutyric acid, reference sample as flakes
(7) Potato pulp, fresh
(8) Beetroot chips, dried and ground
(9) Flax fibers, fibrous layer less than 5 mm
(10) Calcium stearate
(11) Magnesium stearate The following conclusions can be drawn from the foregoing experiments:

Recipes comprising fat and/or lecithin as a release agent (Nos. 2, 4, 6, 24, 25, 26, 39)

In the various test series, recipes have frequently been used in which fats, specifically coconut oil and soybean oils, hardened, were used as release agents. Whereas the fats stated anyway comprise predominantly saturated fatty acids, sensorially perceivable imperfections—rancid—musty smells—can be detected in the UV test and in the storage test. This is also true for the use of lecithin as a release agent (Experiment 24). In case of higher concentrations of high-cellulose material, problems due to a sticking of the baked products will arise in spite of the addition of fat (Experiments Nos. 4, 37).

Control recipe without a release agent (No. 1)

If the mold is clean and ready for the baking operation that recipe will result in an increasingly strong sticking of the baked product and to a formation of visible residues on the baking molds even after a few baking cycles.

Cellulose fibers as a high-cellulose material (Experiments 3 to 5 compared with 7 et seq.; 60 compared with 61)

Just as other fibrous materials, cellulose fibers will increase the mechanical stability of the finished product, which has been conditioned. Whereas that stability is partly decreased by a higher porosity—which is due to a higher water content of the baking composition and to a stronger loosening by water vapor during the baking—it will permit a manufacture of products having modified properties: Lower density, higher flexibility. In spite of the higher water content in high-cellulose compositions (Experiments 4, 5), there will be no evaporation problems, which might be due to the absence of an emulsifying agent.

Fiber length, dimensions of fibrous materials

The cellulose fibers which were used had fiber lengths between 30 micrometers (very short fibers) and 1500 micrometers (long-fiber grade). Problems due to an excessively large fiber dimension have arisen not so much in the feeding of the baking composition—as feeding systems differing from those used for wafer baking compositions can be used for thick compositions (in excess of 2000 mPa.s), pasty compositions (Experiments 60, 61, 63, 64) or compositions which contain fibrous materials—but have arisen owing to the clogging of the vapor escape openings of the baking molds. For this reason, other fibrous materials, specifically ground wood and straw fibers, were reduced in size and screened before use (1 mm mesh size or smaller).

Use of fat plus release agent (Experiment 6)

Fat and release agent may be used together but the resistance to oxidation is decreased.

Concentration of release agent (Experiments 11 to 13)

Even strongly increased contents of release agent will not give rise to problems in the baking operation and will result in accurately shaped bodies; that result is unconceivable where conventional fats are used as release agents.

Conventional release agents (Experiments 10, 11, 19)

Waxes, such as beeswax or paraffin waxes, which were or are used, e.g., in case of a shutdown of automatic wafer-baking machines to impregnate the baking mold against an initial sticking, are not suitable. This is also true for magnesia, which is sometimes used in wafer recipes as a release agent in addition to lecithin and fat.

Humectant (Experiments 16 to 18)

The use of humectants will promote the absorption of moisture and may afford advantages also as regards the microbiological stability. But from the aspect of baking technology the structure of the shaped bodies will be loosened.

Various release agents: Carbocyclic acid and its salts; acid amides (Experiments 20 to 23, 41, 45, 53, 62)

The free acids as well as various salts are suitable from the technological aspect.

Among the metal salts used in various experiments, those having multivalent cations (al, Ca, Mg, Zn) are preferred, because in contrast to the Na salt they will result in the products which are most neutral sensorially. This is significant mainly in case of a contact with delicate contents (such as foodstuffs) in containers.

Various high-cellulose materials (Experiments 27 to 30)

There are examples of various fibrous substances which impart an additional strength. In case of wheat bran, a previous defattening is required to ensure a resistance to oxidative decay. Said raw materials will increase the amount of water required to prepare the composition and are sometimes fed to the baking molds with a pasty consistency at viscosities distinctly in excess of 2000 mPa.s.

Wheat flour as a high-starch raw material

(Experiments 31 to 40)

Wheat flour is a high-starch raw material which is available almost everywhere and can easily be produced. If it is used predominantly or exclusively, problems will arise in two respects, but they can be solved.

1. Wheat flour contains about 1 to 1.5% by weight lipids, which contain predominantly unsaturated fatty acids. The co-use of wheat flour in increasing proportions will result particularly in the UV test in slightly rancid smells, which can be perceived at least by those skilled in the art. This result is less perceivable in the storage test, apparently because said substances, which occur in very small amounts but have a strong smell, are continuously volatilized.

Said changes will be weakened by the co-use of antioxidants, which are not volatilized by water vapor and which spread when they have been melted during the baking operation. Comparable results may be produced by the use of other antioxidants, which are used in the production of plastics.

2. The gluten content of the wheat flour reduces the release action, apparently because it binds parts of the release agent. That result can actively be prevented in that the amount of release agent called for by the recipe is increased and can passively be prevented by the co-use of high-cellulose material (diluting).

Co-use of preservatives

(Experiment 33)

In this respect the use of a preservative is shown by way of example. In analogy to papermaking, such additions will be called for if an exposure of the shaped body to moisture cannot be precluded in use.

Other high-starch raw materials

(Experiments 41 to 44 and 63 et seq.)

The use of other high-starch raw materials, such as starches of various plants and cereal flours, is not excluded. The various raw materials will influence the color and the strength of the structure of the shaped bodies in specific ways. Natural dyestuffs from the raw materials, such as the dyestuffs of corn flour and of corn starch, fade quickly in the storage test and in the UV test.

What has been said of the restricted oxidation resistance of wheat flours is analagously true for other cereal flours (rye flour, barley flour, millet flour, corn flour).

Thickening agents

In addition to the non-starch thickening agents stated in the various examples, modified starches, which have a thickening activity because they have been pregelatinized or chemically modified, may also be used, as has been shown in Examples 11, 15, 26, 35, 45 to 49, 51, 52, 57 to 59.

Dyestuffs

Potato starch is most suitable for a production of purely white shaped bodies. The co-use of water-soluble dyestuffs has been shown by way of example in Experiments 53 to 56.

Fillers

Fillers as materials which do not substantially participate in the formation of the structure of the shaped bodies but are rather passively incorporated will change, e.g., the density (Example 59), the compressive strength or the appearance of the product (pigments 57, 58). The silica gel used in Example 59 as an example of a hard vitreous material has an approximately spherical shape. Fibrous materials of that kind can no longer be regarded only as fillers.

Water content of the baking compositions

As is apparent from the examples, the water content of the baking compositions may vary within wide limits. It is determined by two factors.

1. The absorption of water by the raw materials; Particularly high-cellulose raw materials or flours will require more water than the starches employed if the composition is required to have a specified flowability.

2. The desired consistency: The baking compositions employed have in general either a viscosity between 500 mPa.s and 3000 mPa.s, preferably of 1000 to 2000 mPa.s, or consist of doughlike kneadable preparations, which are no longer flowable or are even no longer cohesive (see Recipes 61, 62).

To define the limits for the process in accordance with the invention, shaped bodies were made with increasing contents of high-starch raw materials.

Example I

| High-starch raw material: | Potato starch (*) | 100 parts by weight |
|---|---|---|
| | Water | x parts by weight |
| | Release agent, thickening agent | 1.5 parts by weight |

*Water content 17.5% by weight

| | Parts by weight of added water x = | Consistency of baking composition | Water content in recipe % by weight |
|---|---|---|---|
| I a | 83.2 | flowable | 55.0 |
| I b | 73.9 | pasty | 42.1 |
| I c | 64.9 | plastic | 39.0 |
| I d | 55.8 | non-cohesive | 35.5 |
| I e | 46.7 | non-cohesive | 31.5 |
| I f | 37.4 | non-cohesive | 26.9 |
| I g | 28.2 | non-cohesive | 21.7 |

From the microscopic, sensorial and physical tests which have been conducted it is apparent that shaped bodies I f and I g have already poorer properties: abrasion of non-gelatinized particles, discontinuity in modulus of elasticity and breaking force.

Example II

| High-starch raw material | | |
|---|---|---|
| Type 550 wheat flour (*) | 100 parts by weight | |
| Water | x parts by weight | |
| Release agent | 1 part by weight | |

*Water content 13.2%

| Parts by weight of added water x = | Consistency of baking composition | Water content in recipe % by weight |
|---|---|---|

| | | | |
|---|---|---|---|
| II a | 92.9 | plastic, soft | 47.9 |
| II b | 83.1 | plastic | 45.1 |
| II c | 73.6 | plastic | 42.2 |
| II d | 64.1 | plastic | 38.8 |
| II e | 54.4 | plastic, dry | 35.0 |
| II f | 44.7 | firm, fragile | 30.7 |
| II g | 35.0 | low cohesiveness | 25.7 |

Test specimens II g exhibit distinctly poorer properties as regards breaking.

The thin-walled shaped bodies which can be made by the process in accordance with the invention have the following properties:

A substantially closed surface

Under the electron microscope an outer skin is seen which has the typical appearance of gelatinized starch with individually included fillers and binders.

A foamlike core structure

The outer skin is adjoined by a porous intermediate layer, which has pores which increase in size toward the center. The pore size will influence properties such as impact absorption and heat insulation. Compared to the known edible wafers and baked thin paper-thin wafers, an incidental splitting at the center of that intermediate layer—that splitting is often described as delamination, flaking peeling, splitting—has not been detected.

Elastic and plastic behavior

As a result of the conditioning which succeeds the baking operation the material becomes increasingly deformable under pressure. As a result of the incorporation of water, the vitrification point is exceeded. At room temperature this will generally occur at water contents above 6% by weight. There is an adjoining wide range with water contents up to 22% by weight. Only thereafter a softening and coalescence of the material occurs in analogy to the melting of solids.

The water contents are obtained as the equilibrium moisture content in dependence on the temperature and the relative humidity (rH). In dependence on the composition, a wide range of increased mechanical stability will be obtained toward high humidities (rH up to 85%) and toward low relative humidities (rH up to about 35%) if native gelatinized starch is used as a main raw material Stability against the action of light and atmospheric oxygen The mechanical properties of the product are not changed (embrittlement) under the action of light and oxygen and substances having a sensorially perceivable smell or taste are not formed.

In contrast to wafers and paper-thin back baked products, all products made in accordance with the invention on the basis of polysaccharides are stable in that respect.

Any changes in color can only be detected when dyestuffs are used which are sensitive to light.

We claim:

1. A process of producing rottable, thin-walled, shaped baked bodies in a multi-part baking mold which may be opened and closed, which comprises the steps of
   (a) opening the baking mold and placing on one of the parts of the opened baking mold a substantially fat-free baking composition containing the following ingredients:
      (1) 30% to 63%, by weight, water,
      (2) 27% to 69%, by weight, starch base,
      (3) 0.04% to 11%, by weight, of at least one release agent selected from the group consisting of medium- and long-chain fatty acids and their salts, derivatives and amides, medium- and long-chain substituted fatty acids and their salts, derivatives and amides, and polymethylhydrogensiloxanes and polymethylhydrogenpolysiloxanes, the siloxanes being present in amounts of 0.05% to 6.5%, by weight,
      (4) 0% to 10%, by weight, thickening agent,
      (5) 0% to 28%, by weight, high-cellulose raw material,
      (6) 0% to 16%, by weight, fibrous material,
      (7) 0% to 10%, by weight, non-fibrous filler,
      (8) 0% to 4.5%, by weight, humectant,
      (9) 0% to 10%, by weight, coloring material,
      (10) 0% to 0.1%, by weight, zirconium salt, expressed as $ZrO_2$, in solution,
      (11) 0% to 0.25%, by weight, preservative, and
      (12) 0% to 0.5%, by weight, antioxidant;
   (b) closing the baking mold after a sufficient amount of the substantially fat-free baking composition has been placed on the one mold part to fill the baking mold and baking the baking composition at a temperature of 145° C. to 230° C. for 25 to 230 seconds;
   (c) opening the baking mold after the baking composition has been baked, and removing the baked shaped bodies therefrom; and
   (d) conditioning the baked shaped bodies at a temperature range of 15° C. to 59° C. at a relative humidity range of 25% to 86% for a time of 30 to 210 minutes to produce a conditioned shaped body containing 6% to 22%, by weight, moisture.

2. The process of claim 1, wherein the baking composition contains 42% to 58%, by weight, water.

3. The process of claim 1, wherein the starch base is selected from at least one member of the group consisting of potato starch, corn starch, wheat starch, rice starch, tapioca starch and mixtures thereof, flour and mixtures of different flours.

4. The process of claim 3, wherein the baking composition contains 36% to 56.5%, by weight, starch base.

5. The process of claim 4, wherein the baking composition contains 44% to 49%, by weight, starch base.

6. The process of claim 3, wherein the baking composition contains 5% to 100%, by weight, potato starch, based on the total weight of the starch base.

7. The process of claim 1, wherein the baking composition contains 0.2% to 4.5%, by weight, release agent.

8. The process of claim 1, wherein the release agent is selected from the group consisting of stearic acid and its sodium, calcium, magnesium, aluminum and zinc salts, fatty acids having a chain length in excess of $C_{12}$ and its salts and derivatives, and a mixture thereof.

9. The process of claim 1, wherein the baking composition contains 0.1% to 4.2%, by weight, polymethylhydrogensiloxane as the release agent.

10. The process of claim 1, wherein the release agent comprises polymethylhydrogenpolysiloxane having the general formula

$$R_3SiO(SiH(CH_3)O)_nSiR_3,$$

wherein R is H, methyl or alkyl, and n is an integer between about 40 and about 100 when R is methyl.

11. The process of claim 1, wherein the thickening agent is selected from the group consisting of gelatinized starch, pregelatinized starch, waste bake products, guar meal, pectin, carubine, carboxymethylcellulose, gum arabic and mixtures thereof.

12. The process of claim 11, wherein the baking composition contains 0.1% to 7.5%, by weight, of the thickening agent.

13. The process of claim 12, wherein the baking composition contains 1% to 5.5%, by weight, of at least one member selected from the group consisting of gelatinized starch, pregelatinized starch and waste baking products.

14. The process of claim 13, wherein the baking composition contains up to 2%, by weight, of at least one member selected from the group consisting of guar meal, pectin, carubine and carboxymethylcellulose.

15. The process of claim 1, wherein the baking composition contains up to 26.9%, by weight, of pulp as high-cellulose raw material.

16. The process of claim 1, wherein the high-cellulose raw material contains up to 16%, by weight, substances having a restricted water absorbency.

17. The process of claim 16, wherein the substances comprise wood chips.

18. The process of claim 1, wherein the high-cellulose raw material contains substances having a very high water absorbency.

19. The process of claim 1, wherein the fibrous material comprises a member selected from the group consisting of plant fibers, fibers of synthetic resin, glass, metal and carbon, and a mixture thereof.

20. The process of claim 1, wherein the non-fibrous filler comprises a member selected from the group consisting of substantially inert fillers, inorganic substances, protein, shellac, calcium carbonate, coal, talc, titanium dioxide, silica gel, aluminum oxide, soybean protein powder, wheat gluten powder, chicken protein powder, casein powder, caseinate powder and a mixture thereof.

21. The process of claim 20, wherein the baking composition contains up to 3%, by weight, of the non-fibrous filler selected from the group consisting of shellac, soybean protein powder, wheat gluten powder, chicken protein powder, casein powder and caseinate powder.

22. The process of claim 20, wherein the baking composition contains up to 1%, by weight, of the protein.

23. The process of claim 1, wherein the baking composition contains fillers and binders selected from the group consisting of calcium carbonate, talc, acetylated cellulose, aluminum oxide, activated carbon, shellac, and a mixture thereof.

24. The process of claim 23, wherein the baking composition contains 0.1% to 17.2%, by weight, of the calcium carbonate.

25. The process of claim 23, wherein the baking composition contains 0.1% to 12.5%, by weight, of the talc.

26. The process of claim 23, wherein the baking composition contains 0.1% to 14.1%, by weight, of the acetylated cellulose.

27. The process of claim 23, wherein the baking composition contains 0.1% to 12.5%, by weight, of the aluminum oxide.

28. The process of claim 23, wherein the baking composition contains 0.1% to 12%, by weight, of the activated carbon.

29. The process of claim 23, wherein the baking composition contains 0.1% to 5%, by weight, of the shellac.

30. The process of claim 11, wherein the baking composition is prewhipped and contains a protein selected from the group consisting of casein, sodium caseinate, soybean isolate, chicken egg white, and a mixture thereof.

31. The process of claim 30, wherein the baking composition contains 0.1% to 2.5%, by weight, of the casein, based on the dry solids content of the composition.

32. The process of claim 30, wherein the baking composition contains 0.1% to 1.3%, by weight, of the sodium caseinate, based on the dry solids content of the composition.

33. The process of claim 30, wherein the baking composition contains 0.1% to 2.6%, by weight, of the soybean isolate, based on the dry solids content of the composition.

34. The process of claim 30, wherein the baking composition contains 0.1% to 1.7%, by weight, of the chicken eggwhite, based on the dry solids content of the composition.

35. The process of claim 1, wherein the humectant is selected from the group consisting of common salt, glycerine, glycols, sorbitol and a mixture thereof.

36. The process of claim 35, wherein the baking composition contains up to 3.5%, by weight, of the common salt.

37. The process of claim 35, wherein the baking composition contains up to 2.5%, by weight, of the glycerine.

38. The process of claim 35, wherein the baking composition contains up to 2.5%, by weight, of the glycols.

39. The process of claim 35, wherein the baking composition contains up to 4.5%, by weight, of the sorbitol.

40. The process of claim 1, wherein the coloring material is selected from the group consisting of inorganic pigments, natural and synthetic dyestuffs, sugar color, carbon blacks, and a mixture thereof.

41. The process of claim 40, wherein the baking composition contains up to 10%, by weight, of the inorganic pigments.

42. The process of claim 40, wherein the baking composition contains up to 0.1%, by weight, of the natural and synthetic dyestuffs.

43. The process of claim 40, wherein the baking composition contains up to 2.5%, by weight, of the sugar color.

44. The process of claim 40, wherein the baking composition contains up to 1%, by weight, of the carbon blacks.

45. The process of claim 40, wherein the baking composition contains up to 3.5%, by weight, of the cocoa powder.

46. The process of claim 1, wherein the baking composition is an ordinary wafer dough without fat and lecithin operating as a release agent.

47. The process of claim 1, comprising the further step of opening the baking mold for short time during baking.

48. The process of claim 1, comprising the further step of adding an additional material to the baking composition placed on the one baking mold part in the opened baking mold and baking the baking composition with the added additional material in the closed baking mold to produce composite shaped baked bodies.

49. The process of claim 48, wherein the additional material is a sheetlike material.

50. The process of claim 49, wherein the additional sheetlike materials are shaped baked bodies produced by the process of claim 18.

51. The process of claim 48, wherein the additional material is a threadlike material.

52. The process of claim 48, wherein the additional material is placed on the one baking mold part before the baking composition.

53. The process of claim 48, wherein the additional material is placed on the one baking mold part after the baking composition.

* * * * *